United States Patent
Itakura et al.

(10) Patent No.: US 11,273,692 B2
(45) Date of Patent: Mar. 15, 2022

(54) DOOR BEAM

(71) Applicants: AISIN CORPORATION, Kariya (JP); AISIN KEIKINZOKU KABUSHIKI KAISHA, Toyama-ken (JP)

(72) Inventors: Taichi Itakura, Kariya (JP); Kazuhiro Kaimai, Kariya (JP); Kiyoichi Kita, Okazaki (JP); Jun Shobo, Anjo (JP); Tamaki Obayashi, Toyama (JP); Kazutaka Mori, Imizu (JP)

(73) Assignees: Aisin Corporation, Kariya (JP); Aisin Keikinzoku Kabushiki Kaisha, Imizu (JP)

( * ) Notice: Subject to any disclaimer, the term of this patent is extended or adjusted under 35 U.S.C. 154(b) by 0 days.

(21) Appl. No.: 16/871,161

(22) Filed: May 11, 2020

(65) Prior Publication Data

US 2020/0361295 A1  Nov. 19, 2020

(30) Foreign Application Priority Data

May 16, 2019 (JP) .............................. JP2019-092882
Nov. 6, 2019 (JP) .............................. JP2019-201384
Apr. 2, 2020 (JP) .............................. JP2020-066667

(51) Int. Cl.
    *B60J 5/04*     (2006.01)

(52) U.S. Cl.
    CPC .................................. *B60J 5/0444* (2013.01)

(58) Field of Classification Search
    CPC ....................................................... B60J 5/0444
    USPC ........................................................ 296/146.6
    See application file for complete search history.

(56) References Cited

U.S. PATENT DOCUMENTS

| | | | |
|---|---|---|---|
| 2001/0024734 A1* | 9/2001 | Yamashita | B60J 5/0444 428/598 |
| 2003/0132643 A1* | 7/2003 | Sakuma | B60J 5/0444 296/146.6 |

FOREIGN PATENT DOCUMENTS

JP         2017-217924         12/2017

* cited by examiner

Primary Examiner — Joseph D. Pape
(74) Attorney, Agent, or Firm — Finnegan, Henderson, Farabow, Garrett & Dunner, LLP

(57) ABSTRACT

A door beam includes: an upper inner flange; a lower inner flange; an outer flange; an upper rib; and a lower rib. A thickness of the outer flange is larger than a thickness of the upper inner flange and a thickness of the lower inner flange. A thickness of the upper rib becomes gradually larger from the outer flange toward the upper inner flange, and a thickness of the lower rib becomes gradually larger from the outer flange toward the lower inner flange.

12 Claims, 33 Drawing Sheets

FIG.18

|  | REFERENCE EXAMPLE 1 | REFERENCE EXAMPLE 2 | REFERENCE EXAMPLE 3 | REFERENCE EXAMPLE 4 | REFERENCE EXAMPLE 5 |
|---|---|---|---|---|---|
| ASPECT RATIO L2/W | 0.78 | 0.72 | 0.67 | 0.61 | 0.56 |
| TILTING OF CROSS SECTION | NOT OCCUR | NOT OCCUR | OCCUR | OCCUR | OCCUR |

DOOR BEAM

This nonprovisional application is based on Japanese Patent Application No. 2019-092882 filed on May 16, 2019, No. 2019-201384 filed on Nov. 6, 2019, and No. 2020-066667 filed on Apr. 2, 2020 with the Japan Patent Office, the entire contents of which are hereby incorporated by reference.

BACKGROUND OF THE INVENTION

Field of the Invention

The present invention relates to a door beam.

Description of the Background Art

A door beam that reinforces an inner panel and an outer panel that form a door of a vehicle has been conventionally known. For example, Japanese Patent Laying-Open No. 2017-217924 discloses a door beam including an inner flange, an outer flange and a pair of webs. The pair of webs couple the inner flange to the outer flange. The inner flange, the outer flange and the pair of webs form a rectangular closed cross section.

SUMMARY OF THE INVENTION

Since the door beam described in Japanese Patent Laying-Open No. 2017-217924 has the closed cross section, an amount of absorption of impact energy when the door is subject to impact is ensured. However, the door beam increases in weight.

It is an object of the present invention to provide a door beam that can be reduced in weight, while ensuring an amount of absorption of impact energy.

A door beam according to the present invention is a door beam arranged between an inner panel and an outer panel that form a door of a vehicle, the door beam reinforcing the inner panel and the outer panel, the door beam including: an upper inner flange arranged on the inner panel side; a lower inner flange arranged on the inner panel side and below the upper inner flange; an outer flange arranged on the outer panel side; an upper rib that couples the upper inner flange to the outer flange; and a lower rib that couples the lower inner flange to the outer flange, wherein a thickness of the outer flange is larger than a thickness of the upper inner flange and a thickness of the lower inner flange, a thickness of the upper rib becomes gradually larger from the outer flange toward the upper inner flange, and a thickness of the lower rib becomes gradually larger from the outer flange toward the lower inner flange.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a table showing results of an aspect ratio L2/W and tilting of a cross section in Reference Examples 1 to 5.

DESCRIPTION OF THE PREFERRED EMBODIMENTS

Figure 1:
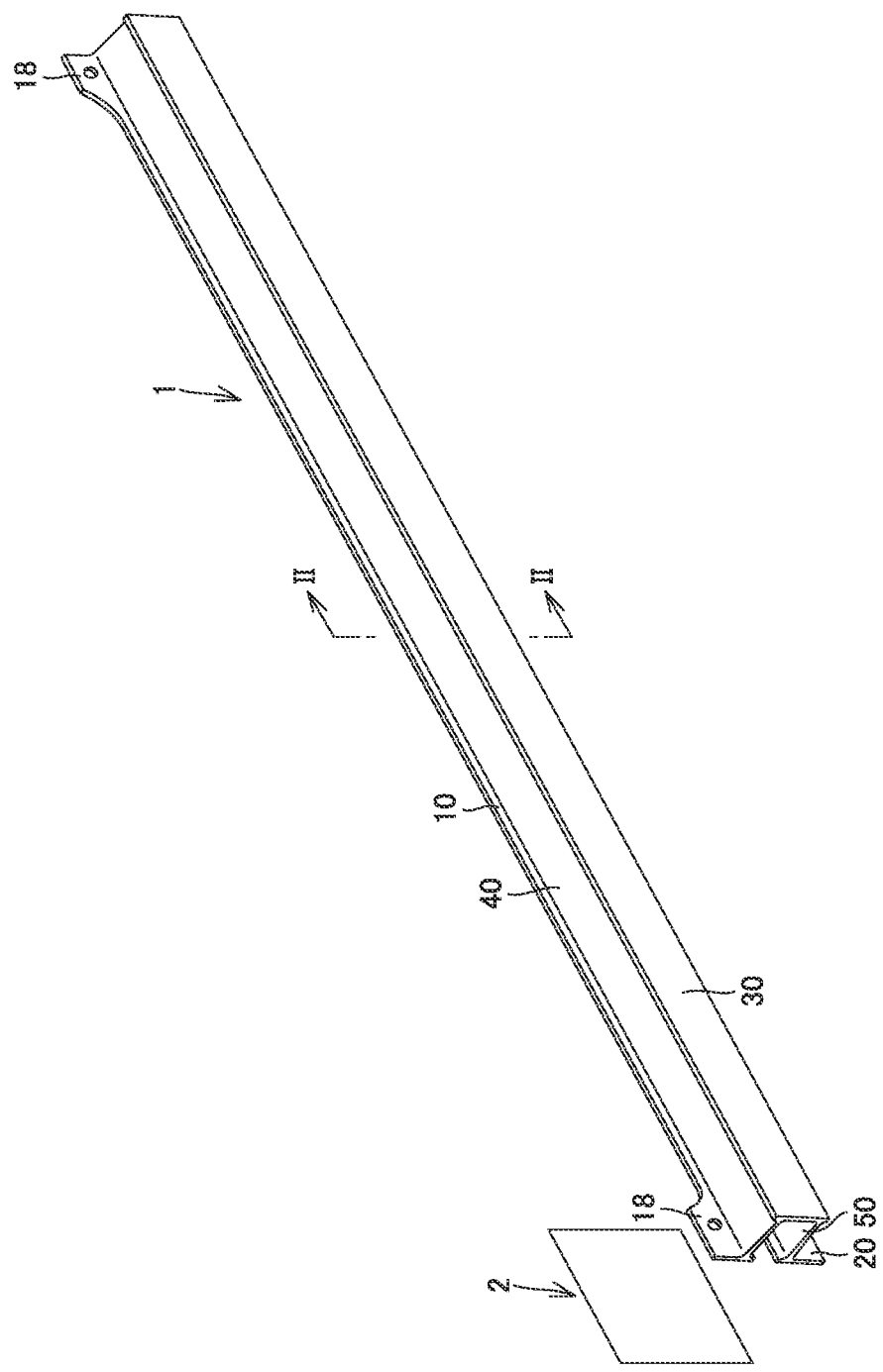
FIG. 1 is a perspective view of a door beam according to a first embodiment of the present invention.

Embodiments of the present invention will be described with reference to the drawings, in which the same or corresponding members are denoted by the same reference numerals.

First Embodiment

Figure 2:
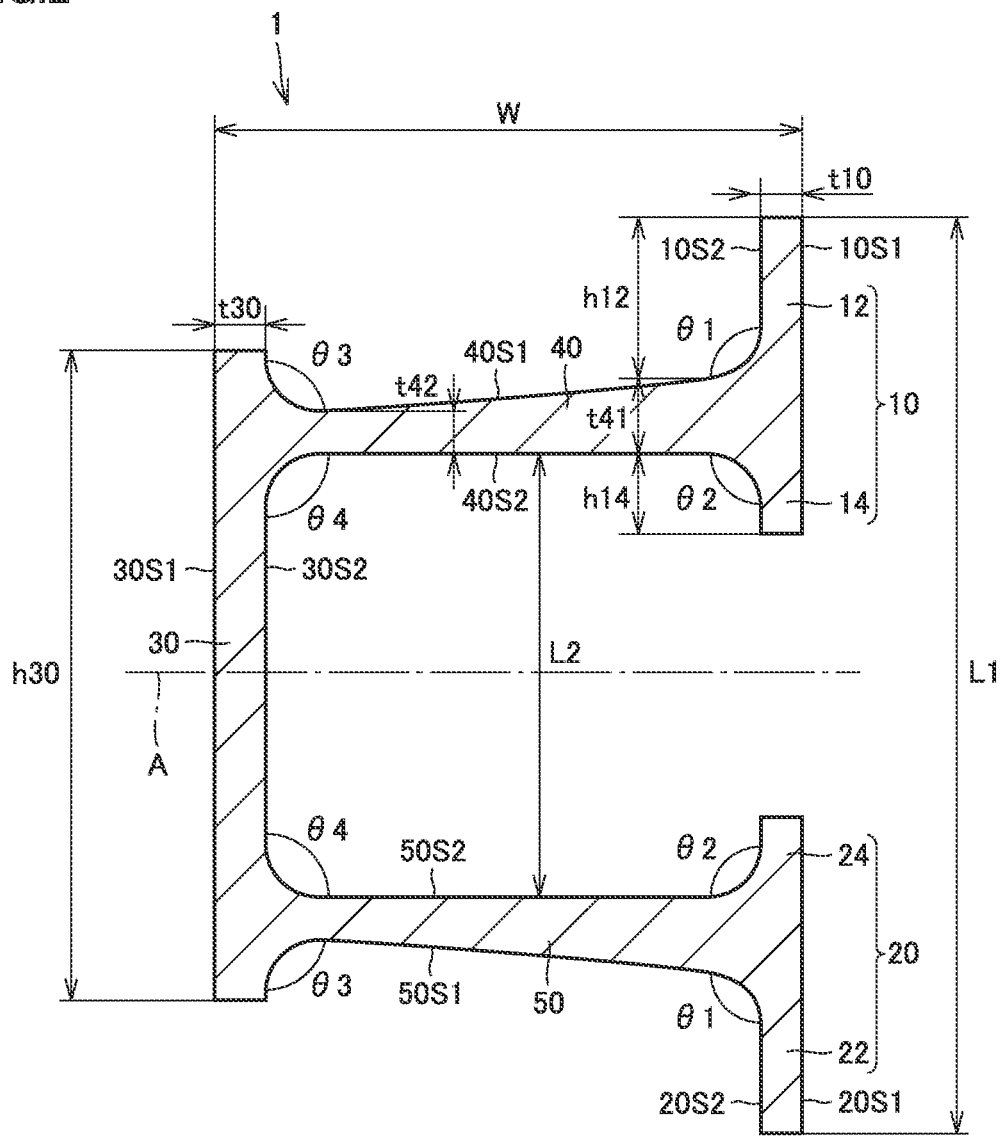
FIG. 2 is a cross-sectional view taken along line II-II shown in FIG. 1.

FIG. 1 is a perspective view of a door beam according to a first embodiment of the present invention. FIG. 2 is a cross-sectional view taken along line II-II shown in FIG. 1. A door beam 1 is arranged between an inner panel (not shown) and an outer panel (not shown) that form a door of a vehicle. Door beam 1 reinforces the inner panel and the outer panel. Door beam 1 is made of aluminum or an aluminum alloy. Door beam 1 has a shape that extends in one direction (front-back direction of the vehicle). In the present embodiment, door beam 1 is manufactured by extrusion molding.

As shown in FIG. 1, door beam 1 includes an upper inner flange 10, a lower inner flange 20, an outer flange 30, an upper rib 40, and a lower rib 50.

Upper inner flange 10 is arranged on the inner panel side. Upper inner flange 10 has a shape that extends in one direction. Upper inner flange 10 is formed like a flat plate. Upper inner flange 10 is arranged to be substantially parallel to a vertical direction. A surface (outer surface 10S1 in a width direction) of upper inner flange 10 that faces the inner panel, and a surface (inner surface 10S2 in the width direction) opposite to the surface are formed to be flat. A thickness t10 of upper inner flange 10 is uniform in above-described one direction. Thickness t10 is set at, for example, 2.5 mm.

Each of opposing ends of upper inner flange 10 in one direction is provided with an upper fixed portion 18 fixed to the inner panel through a bracket 2. A length of upper fixed portion 18 in the vertical direction is longer than a length of a portion of upper inner flange 10 other than upper fixed portion 18 in the vertical direction.

Lower inner flange 20 is arranged on the inner panel side and below upper inner flange 10. That is, lower inner flange 20 is provided at a position spaced downward apart from upper inner flange 10. Lower inner flange 20 has a shape that extends in one direction. Lower inner flange 20 is formed like a flat plate. Lower inner flange 20 is arranged to be substantially parallel to the vertical direction. A surface (outer surface 20S1 in the width direction) of lower inner flange 20 that faces the inner panel, and a surface (inner surface 20S2 in the width direction) opposite to the surface are formed to be flat. Outer surface 20S1 of lower inner flange 20 is flush with outer surface 10S1 of upper inner flange 10. A thickness of lower inner flange 20 is the same as thickness t10 of upper inner flange 10.

Each of opposing ends of lower inner flange 20 in one direction is provided with a lower fixed portion fixed to the inner panel through bracket 2. A length of the lower fixed portion in the vertical direction is longer than a length of a portion of lower inner flange 20 other than the lower fixed portion in the vertical direction.

A length L1 from an upper end of upper inner flange 10 to a lower end of lower inner flange 20 is set at, for example, 54.4 mm.

Outer flange 30 is arranged on the outer panel side. Outer flange 30 has a shape that extends in one direction. Outer flange 30 is formed like a flat plate. Outer flange 30 is arranged to be substantially parallel to the vertical direction. That is, an outer surface 30S1 and an inner surface 30S2 of outer flange 30 in the width direction (horizontal direction in FIG. 2) that connects upper inner flange 10 and outer flange 30 are formed to be flat. A thickness t30 of outer flange 30 is uniform in above-described one direction. Thickness t30 of outer flange 30 is larger than thickness t10 of upper inner flange 10 and the thickness of lower inner flange 20. Thickness t30 is set at, for example, 3 mm. A distance W between outer surface 30S1 of outer flange 30 and outer surface 10S1 of upper inner flange 10 is set at, for example, 35 mm. A length h30 of outer flange 30 in the vertical direction is longer than the length of upper inner flange 10 in the vertical direction, and is longer than the length of lower inner flange 20 in the vertical direction. Length h30 is set at, for example, 38.4 mm.

Upper rib 40 couples upper inner flange 10 to outer flange 30. Upper rib 40 has a shape that extends in one direction. Upper rib 40 includes an upper outer surface 40S1 that is an upper-side side surface in the vertical direction, and an upper inner surface 40S2 that is a lower-side side surface in the vertical direction. Upper outer surface 40S1 has a shape that is slightly curved to be convex downward. However, upper outer surface 40S1 may be formed to be flat. Upper inner surface 40S2 is formed to be flat. As shown in FIG. 2, a thickness of upper rib 40 becomes gradually larger from outer flange 30 toward upper inner flange 10. The thickness of upper rib 40 is uniform in above-described one direction.

As shown in FIGS. 1 and 2, an inner (right in FIG. 2) end of upper rib 40 in the width direction is connected to an intermediate portion of inner surface 10S2 of upper inner flange 10 in the vertical direction. Upper inner flange 10 includes an upper outward-protruding portion 12 and an upper inward-protruding portion 14.

Upper outward-protruding portion 12 has a shape that protrudes upward from upper rib 40 in the vertical direction. A boundary portion between upper outward-protruding portion 12 and upper outer surface 40S1 has a shape that is curved to be convex outward in the width direction and downward. A curvature of the boundary portion is greater than a curvature of upper outer surface 40S1. An angle θ1 formed by inner surface 10S2 of upper outward-protruding portion 12 and upper outer surface 40S1 is an obtuse angle. Angle θ1 refers to an angle formed by inner surface 10S2 of upper outward-protruding portion 12 and a tangential line in a portion (hereinafter, referred to as "first portion") of upper outer surface 40S1 where the curvature varies.

Upper inward-protruding portion 14 has a shape that protrudes downward from upper rib 40 in the vertical direction. A boundary portion between upper inward-protruding portion 14 and upper inner surface 40S2 has a shape that is curved to be convex outward in the width direction and upward. An angle θ2 formed by upper inward-protruding portion 14 and upper inner surface 40S2 is 90 degrees.

A length h12 of upper outward-protruding portion 12 in the vertical direction is equal to or longer than a length h14 of upper inward-protruding portion 14 in the vertical direction. In the present embodiment, length h12 is longer than length h14. Length h12 refers to a length from the above-described first portion to an upper end of upper outward-protruding portion 12. Length h14 refers to a length from upper inner surface 40S2 to a lower end of upper inward-protruding portion 14.

As shown in FIGS. 1 and 2, an outer (left in FIG. 2) end of upper rib 40 in the width direction is connected to a portion of inner surface 30S2 of outer flange 30 located below an upper end of outer flange 30. A boundary portion between inner surface 30S2 of outer flange 30 and upper outer surface 40S1 has a shape that is curved to be convex outward in the width direction and downward. A curvature of the boundary portion is greater than the curvature of upper outer surface 40S1. An angle θ3 formed by inner surface 30S2 of outer flange 30 and upper outer surface 40S1 is substantially 90 degrees. Angle θ3 refers to an angle formed by inner surface 30S2 of outer flange 30 and a tangential line in a portion (hereinafter, referred to as "second portion") of upper outer surface 40S1 where the curvature varies.

A boundary portion between inner surface 30S2 of outer flange 30 and upper inner surface 40S2 has a shape that is curved to be convex outward in the width direction and upward. A curvature of the boundary portion is greater than the curvature of upper outer surface 40S1. An angle θ4 formed by inner surface 30S2 of outer flange 30 and upper inner surface 40S2 is 90 degrees.

A thickness t41 in the first portion is set to be approximately twice as large as a thickness t42 in the second portion. For example, thickness t41 is set at 5 mm and thickness t42 is set at 2.5 mm.

Lower rib 50 couples lower inner flange 20 to outer flange 30.

Door beam 1 according to the present embodiment has a vertically symmetric shape with respect to a symmetric plane A (see FIG. 2) that is parallel to the width direction and passes through a center of outer flange 30 in the vertical direction. That is, lower inner flange 20 has a shape that is symmetric to upper inner flange 10 with respect to symmetric plane A, and lower rib 50 has a shape that is symmetric to upper rib 40 with respect to symmetric plane A. Therefore, description of lower inner flange 20 and lower rib 50 will be simplified.

Specifically, lower inner flange 20 includes a lower outward-protruding portion 22 and a lower inward-protruding portion 24, and lower rib 50 includes a lower outer surface 50S1 and a lower inner surface 50S2. A ratio of a distance L2 between upper inner surface 40S2 and lower inner surface 50S2 to above-described distance W is set to be equal to or higher than 0.7. Distance L2 is set at, for example, 26.4 mm.

Figure 3:
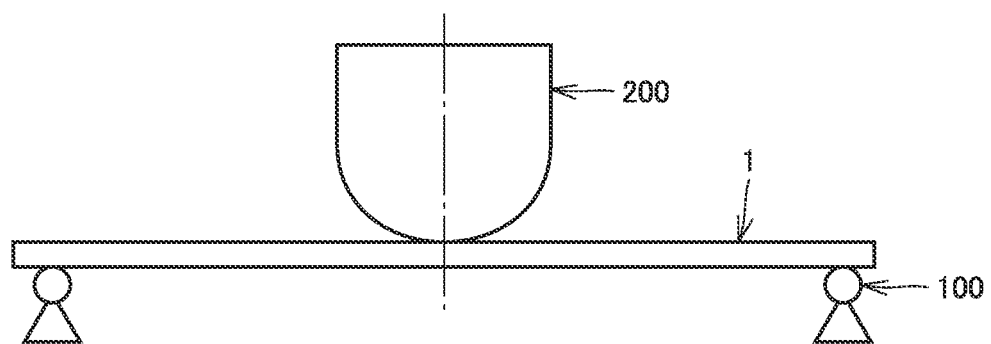
FIG. 3 is a schematic view for illustrating a method of a three-point bending test.

Next, using Example 1 of door beam 1 according to the present embodiment and three Comparative Examples for Example 1, a three-point bending test was performed with an apparatus shown in FIG. 3. In the three-point bending test, the door beam placed on a support 100 was pressed by an indenter 200, to be thereby bent and deformed.

Figure 4:
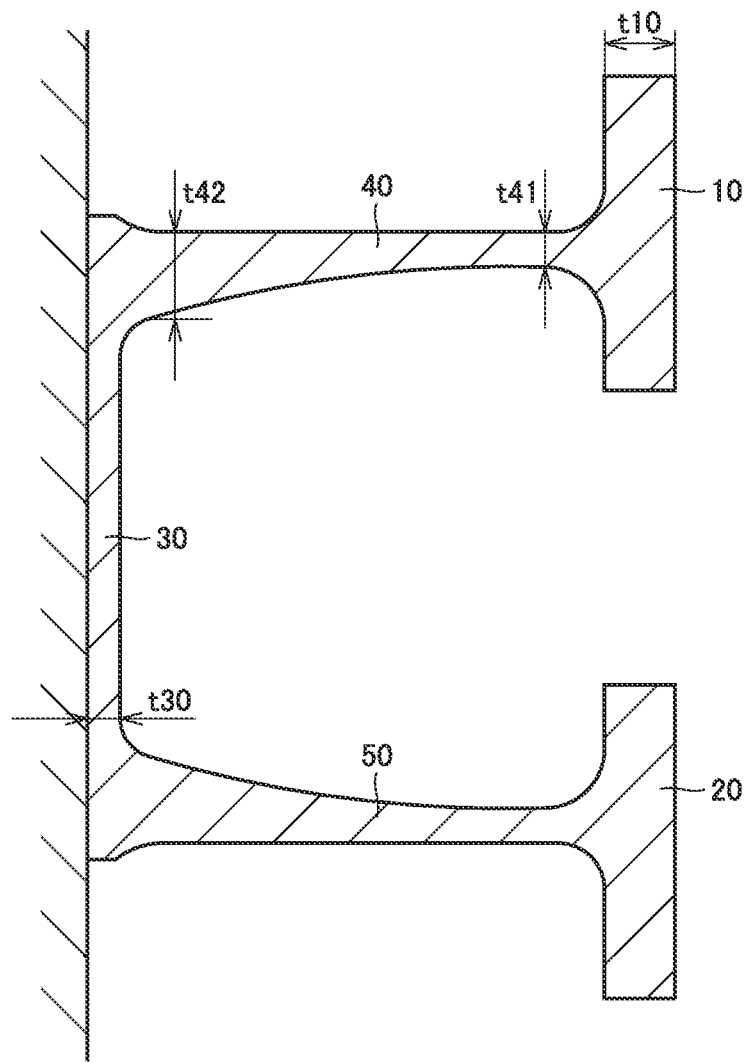
FIG. 4 is a cross-sectional view of a door beam in Comparative Example 1.

Example 1 corresponds to door beam 1 having a cross-sectional shape shown in FIG. 2. FIG. 4 shows a cross section of a door beam in Comparative Example 1. As shown in FIG. 4, in Comparative Example 1, thickness t30 of outer flange 30 is smaller than thickness t10 of upper inner flange 10 and the thickness of lower inner flange 20, and the thickness of upper rib 40 and the thickness of lower rib 50 become gradually smaller from outer flange 30 toward upper inner flange 10.

Figure 5:
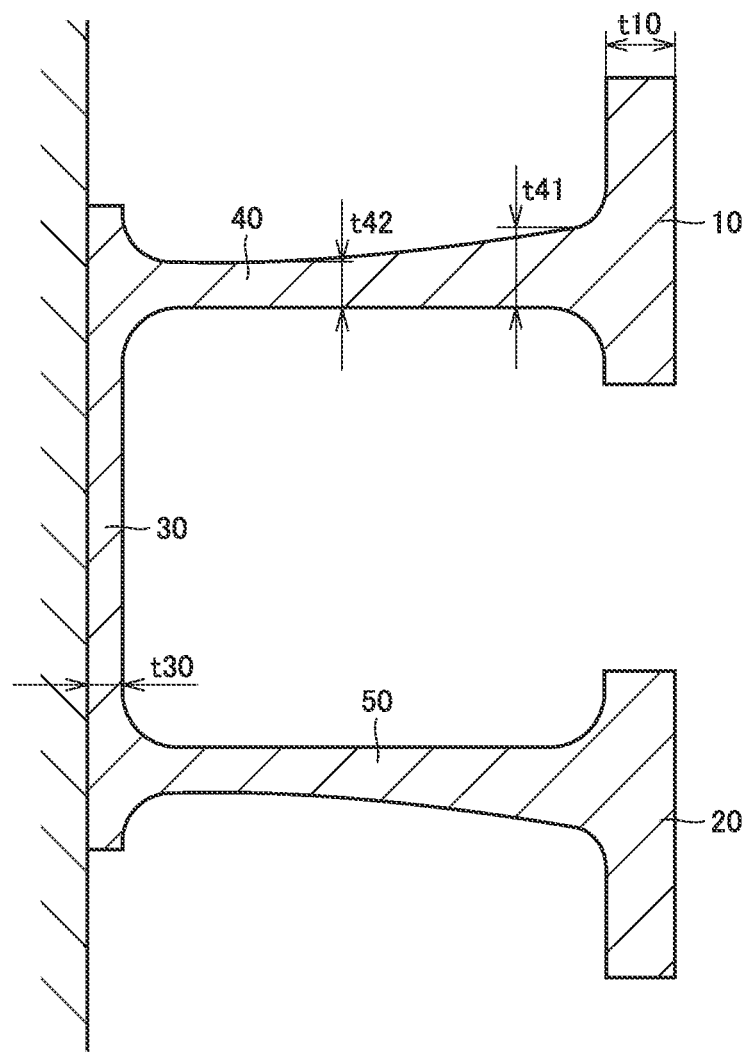
FIG. 5 is a cross-sectional view of a door beam in Comparative Example 2.

FIG. 5 shows a cross section of a door beam in Comparative Example 2. As shown in FIG. 5, in Comparative Example 2, thickness t30 of outer flange 30 is smaller than thickness t10 of upper inner flange 10 and the thickness of lower inner flange 20.

Figure 6:
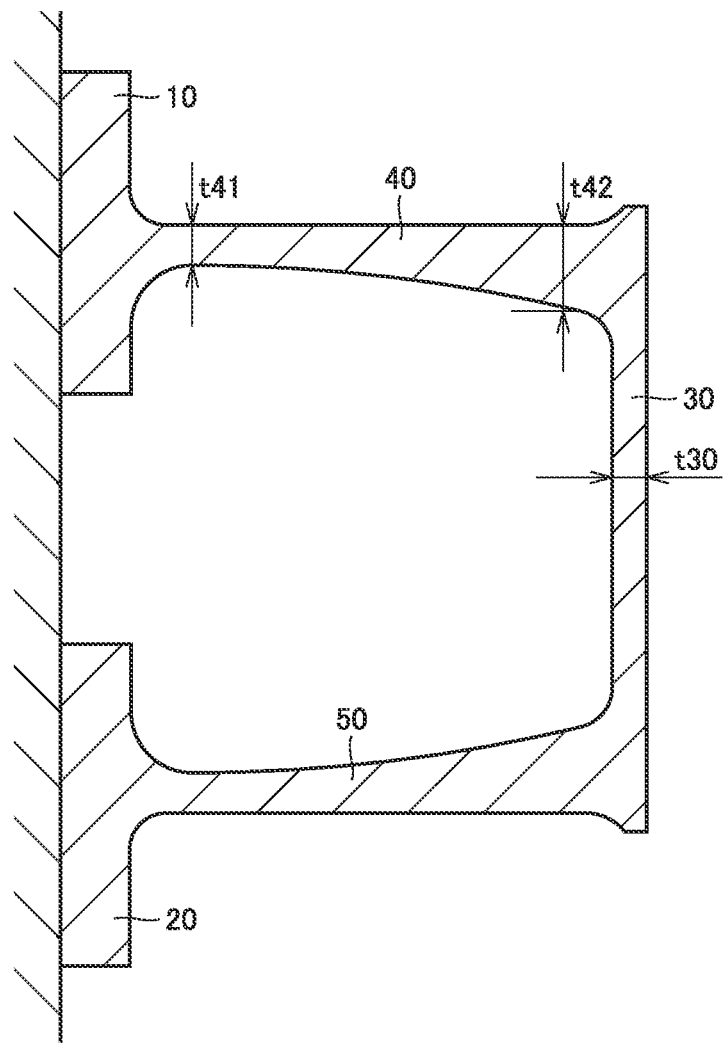
FIG. 6 is a cross-sectional view of a door beam in Comparative Example 3.

FIG. 6 shows a cross section of a door beam in Comparative Example 3. As shown in FIG. 6, although Comparative Example 3 is the same in shape as Comparative Example 1, outer flange 30 was placed on support 100 and each of inner flanges 10 and 20 was pressed by indenter 200. In Example 1, Comparative Example 1 and Comparative Example 2, each of inner flanges 10 and 20 was placed on support 100 and outer flange 30 was pressed by indenter 200.

Figure 7:
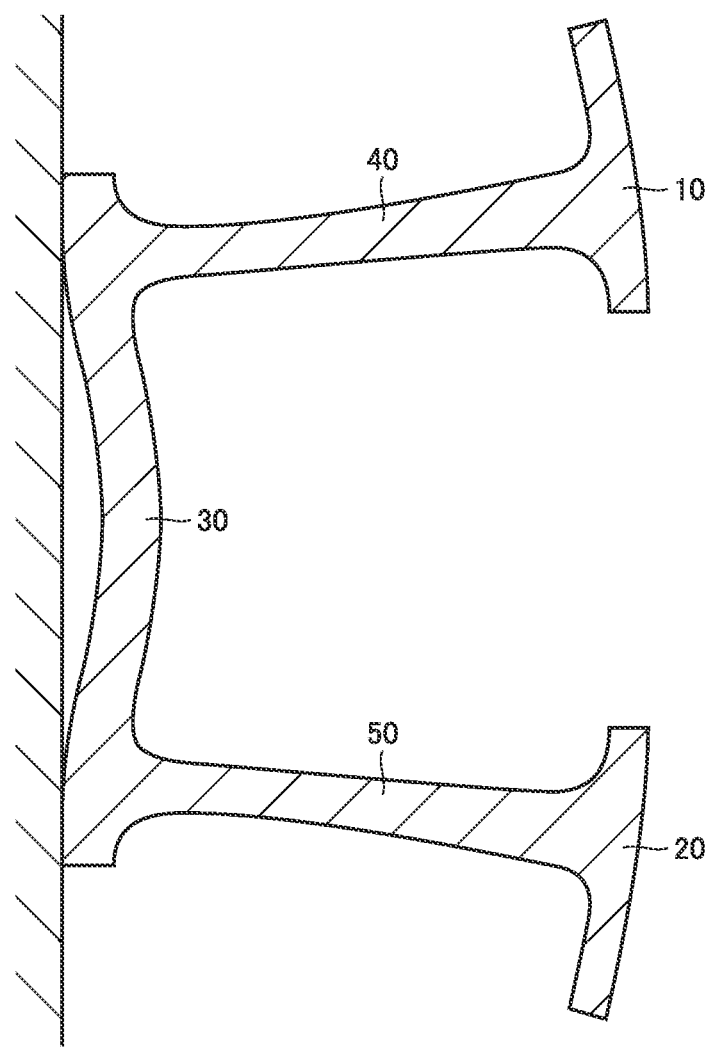
FIG. 7 is a cross-sectional view during a three-point bending test in Example 1.
Figure 8:
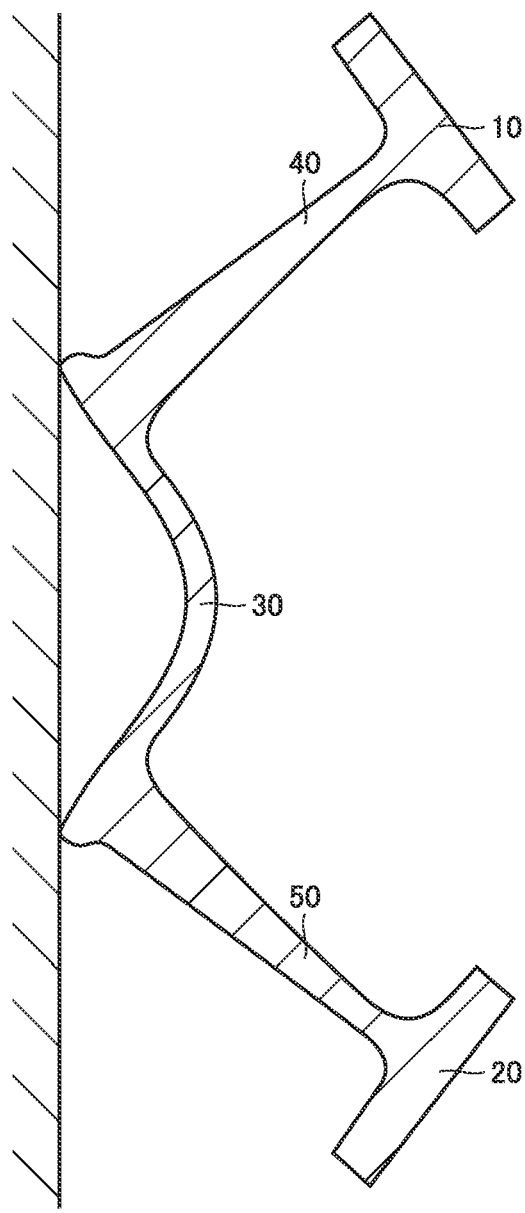
FIG. 8 is a cross-sectional view during a three-point bending test in Comparative Example 1.
Figure 9:
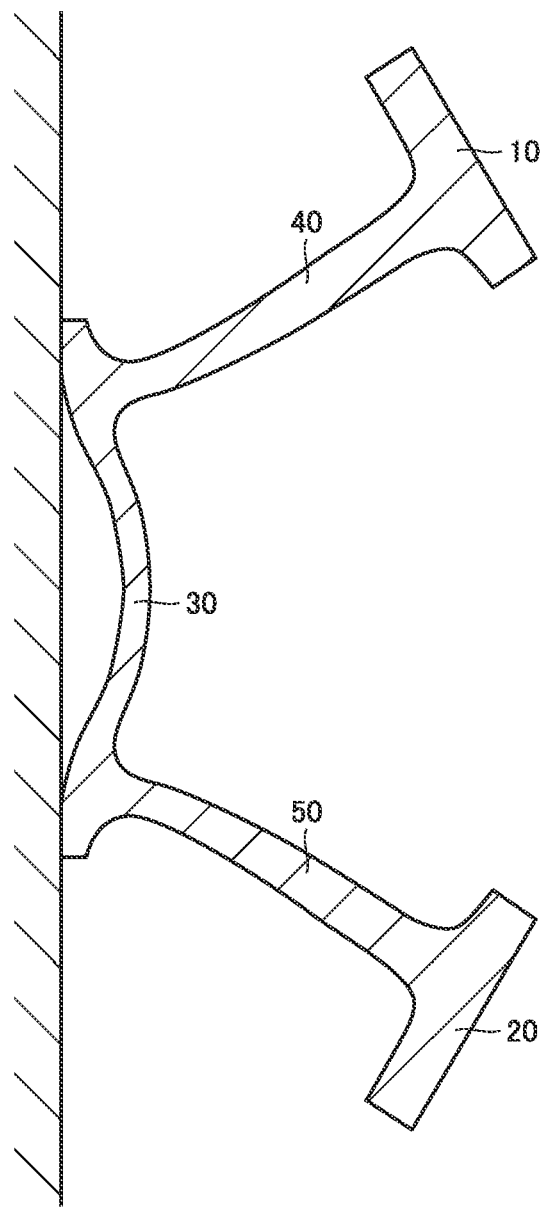
FIG. 9 is a cross-sectional view during a three-point bending test in Comparative Example 2.
Figure 10:
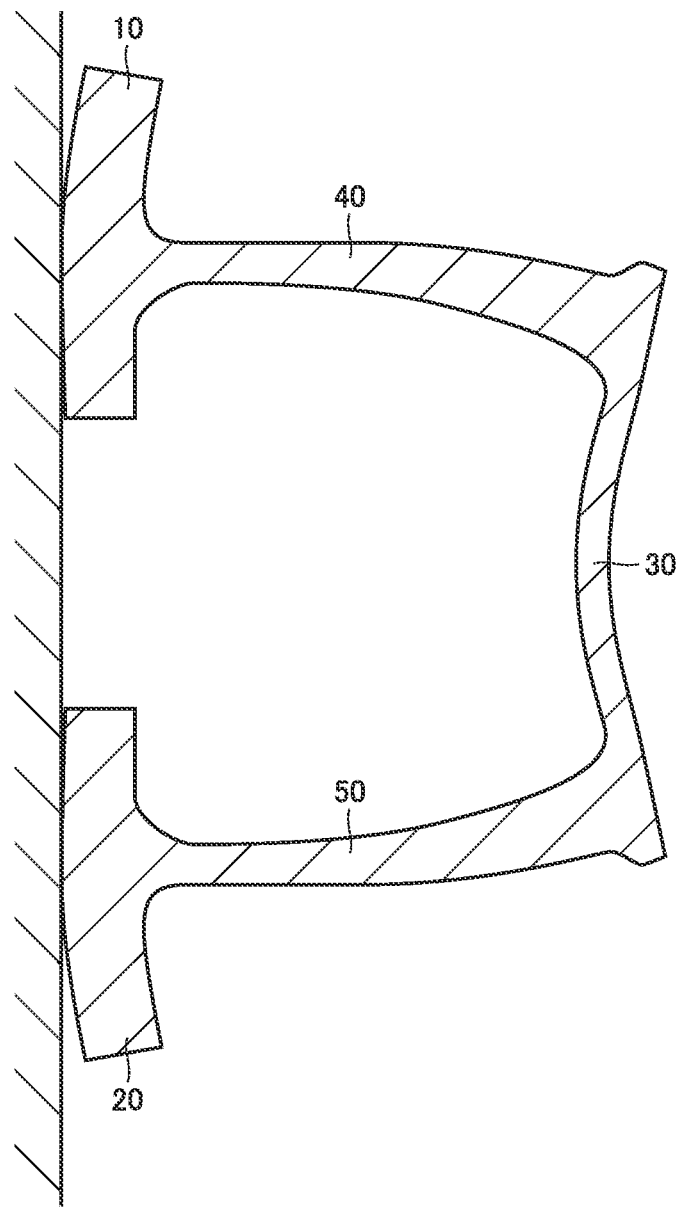
FIG. 10 is a cross-sectional view during a three-point bending test in Comparative Example 3.

FIG. 7 shows a state of Example 1 pressed by indenter 200. FIG. 8 shows a state of Comparative Example 1 pressed by indenter 200. FIG. 9 shows a state of Comparative Example 2 pressed by indenter 200. FIG. 10 shows a state of Comparative Example 3 pressed by indenter 200.

As shown in FIG. 8, opening of the cross section (distance between upper inner flange 10 and lower inner flange 20) was greater in Comparative Example 1 than in Example 1. As shown in FIG. 9, although opening of the cross section was slightly smaller in Comparative Example 2 than in Comparative Example 1, opening of the cross section was greater in Comparative Example 2 than in Example 1. This is because thickness t30 of outer flange 30 in each of Comparative Examples 1 and 2 was smaller than that in Example 1.

Figure 11:
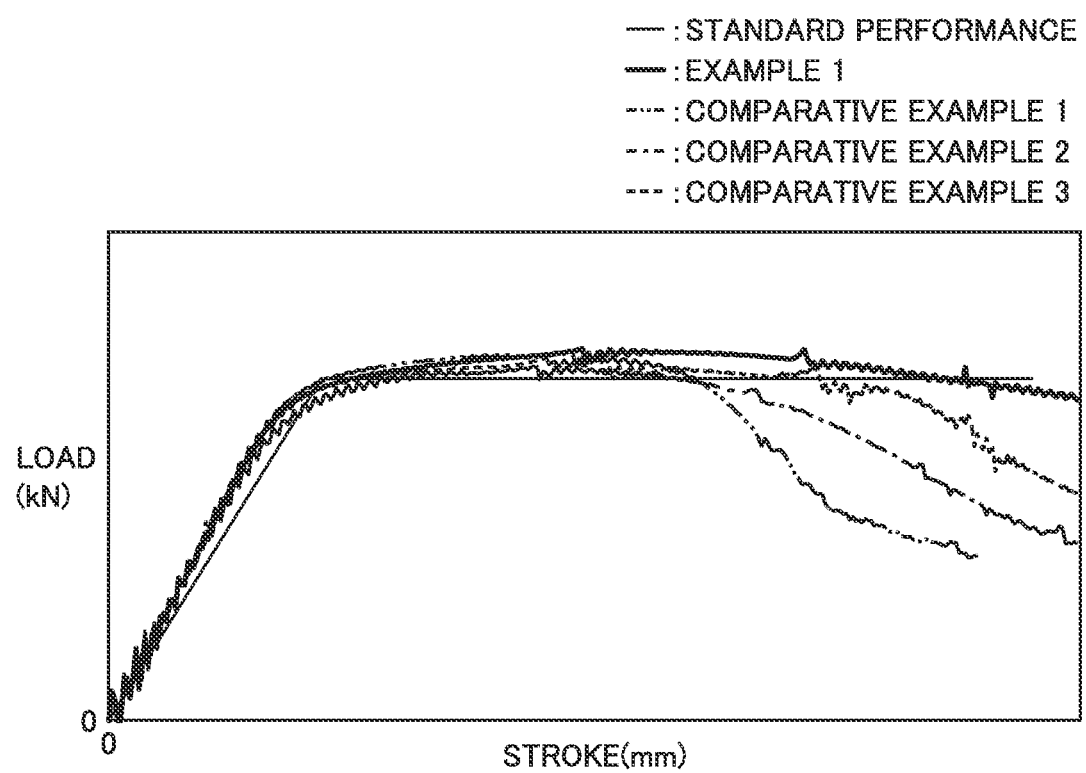
FIG. 11 is a graph showing results of the three-point bending test in Example 1 and Comparative Examples 1 to 3.

FIG. 11 shows test results in Example 1 and each Comparative Example. As shown in FIG. 11, Example 1 satisfied the standard performance, whereas Comparative Examples 1 to 3 did not satisfy the standard performance in a range where a stroke of indenter 200 was large.

Next, the ratio of distance L2 (distance between upper inner surface 40S2 and lower inner surface 50S2) to distance W (distance between outer surface 30S1 of outer flange 30 and outer surface 10S1 of upper inner flange 10) will be described with reference to FIGS. 12 to 18.

Figure 12:
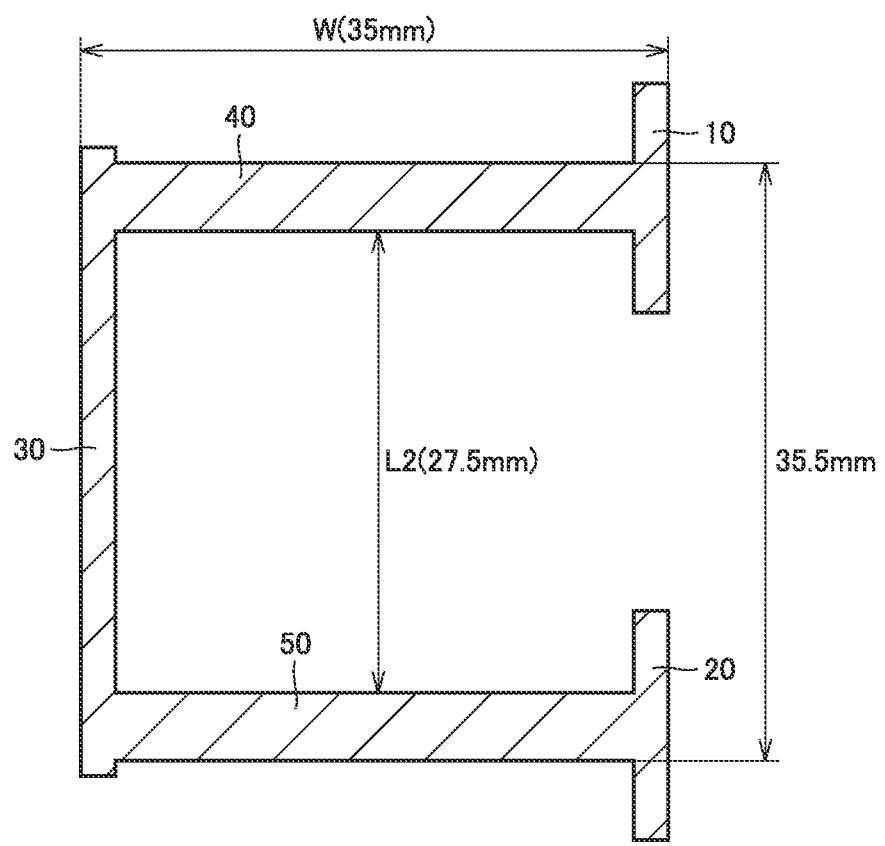
FIG. 12 is a cross-sectional view of a door beam in Reference Example 1.
Figure 13:
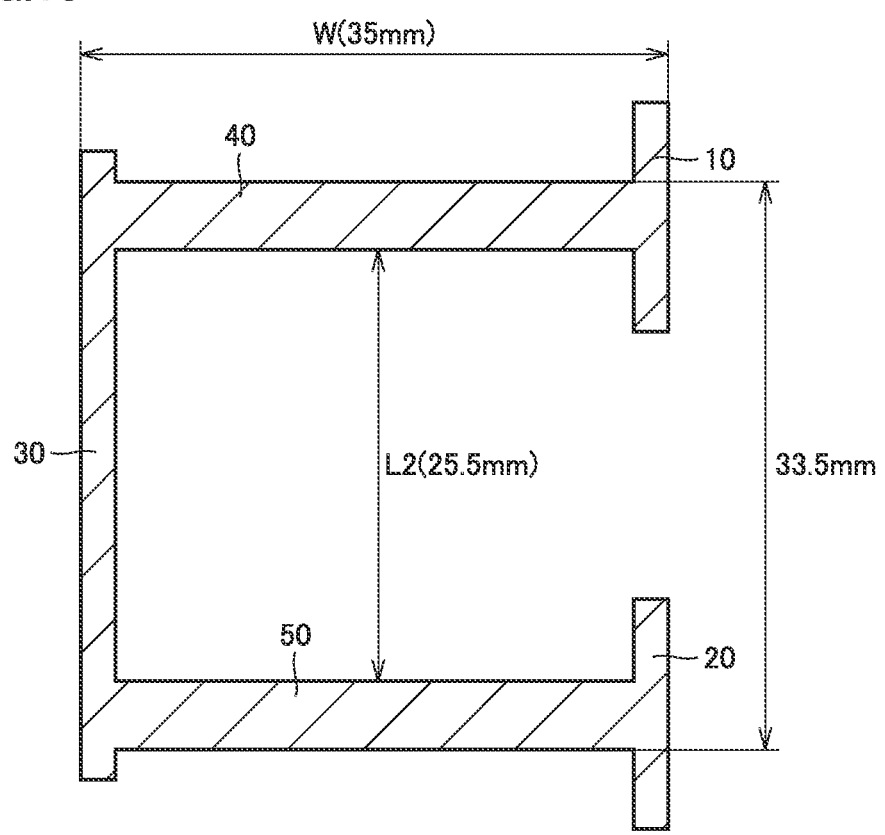
FIG. 13 is a cross-sectional view of a door beam in Reference Example 2.
Figure 14:
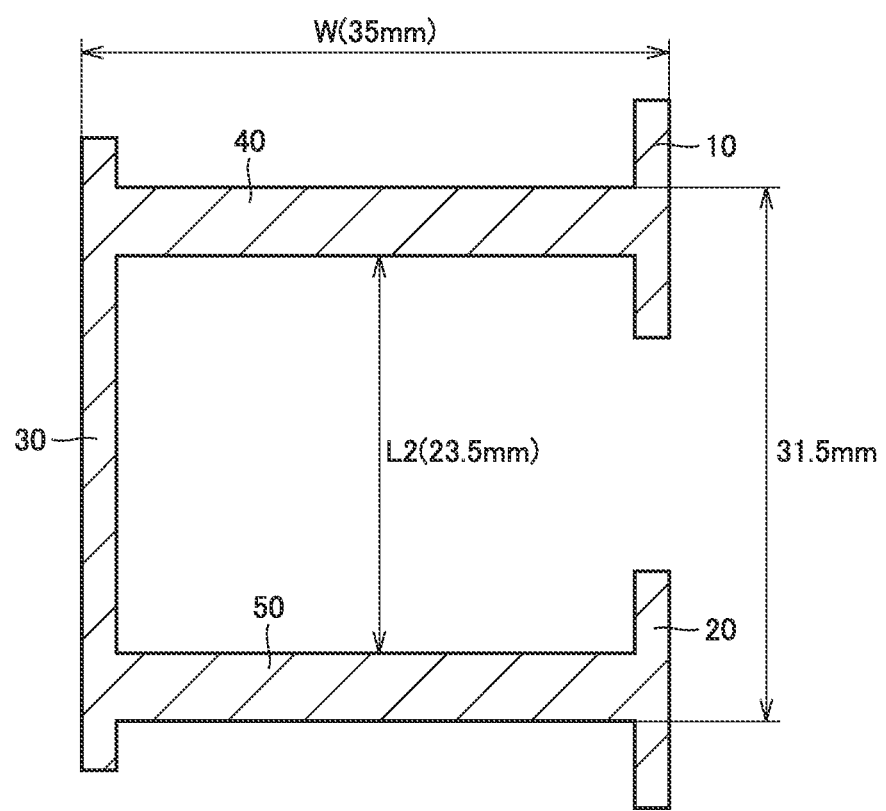
FIG. 14 is a cross-sectional view of a door beam in Reference Example 3.
Figure 15:
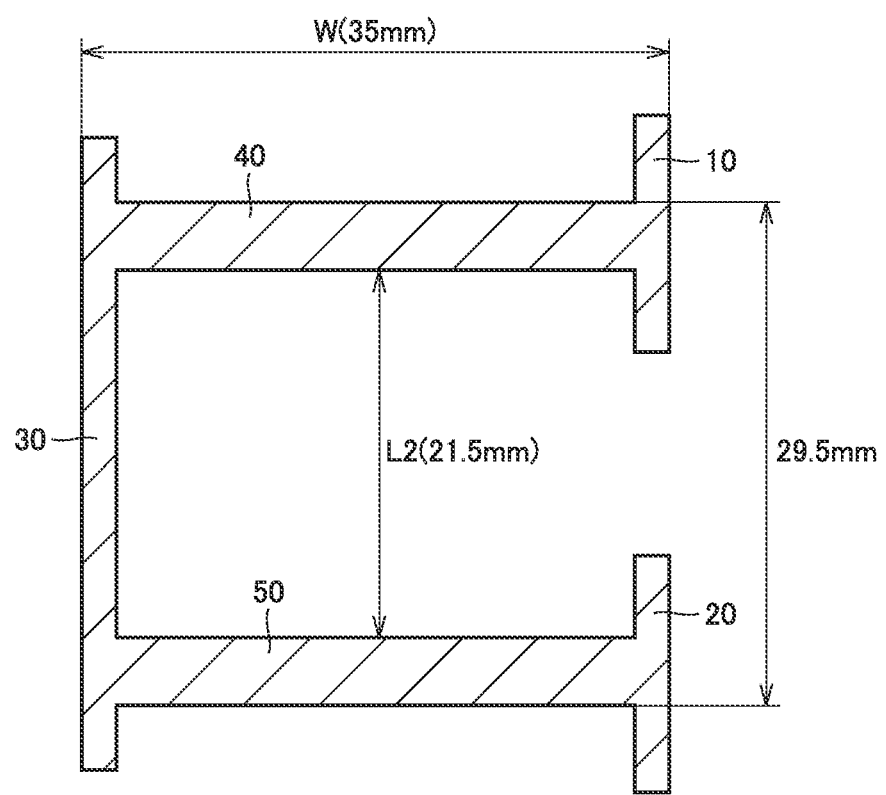
FIG. 15 is a cross-sectional view of a door beam in Reference Example 4.
Figure 16:
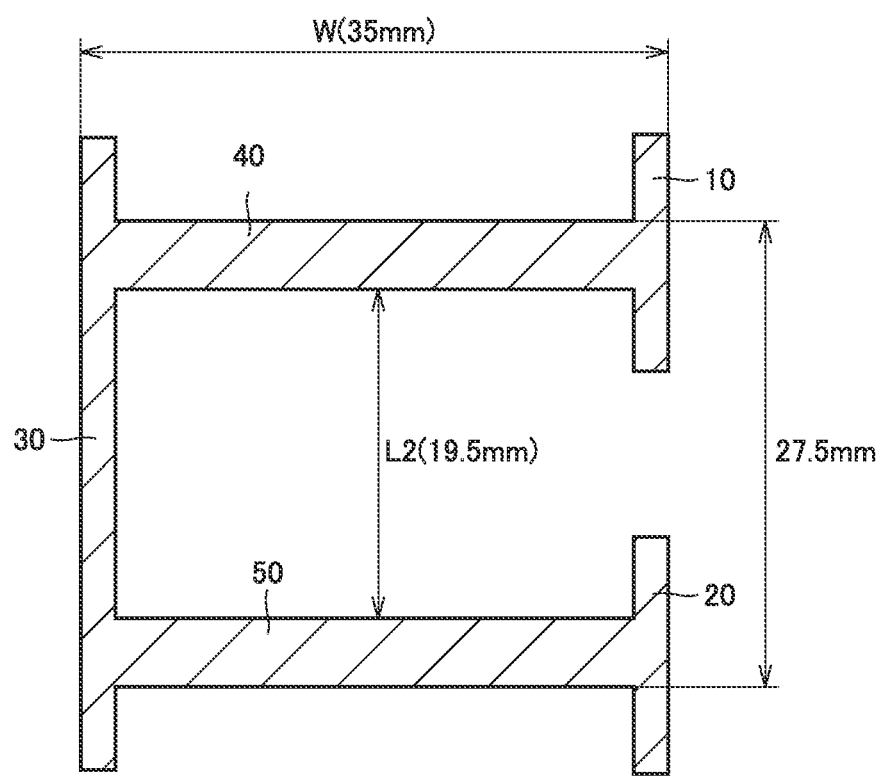
FIG. 16 is a cross-sectional view of a door beam in Reference Example 5.

FIG. 12 shows Reference Example 1. In Reference Example 1, distance L2 is 27.5 mm and distance W is 35 mm (aspect ratio L2/W is 0.78). FIG. 13 shows Reference Example 2. In Reference Example 2, distance L2 is 25.5 mm and distance W is 35 mm (aspect ratio L2/W is 0.72). FIG. 14 shows Reference Example 3. In Reference Example 3, distance L2 is 23.5 mm and distance W is 35 mm (aspect ratio L2/W is 0.67). FIG. 15 shows Reference Example 4. In Reference Example 4, distance L2 is 21.5 mm and distance W is 35 mm (aspect ratio L2/W is 0.62). FIG. 15 shows Reference Example 5. In Reference Example 5, distance L2 is 19.5 mm and distance W is 35 mm (aspect ratio L2/W is 0.56).

Figure 17:
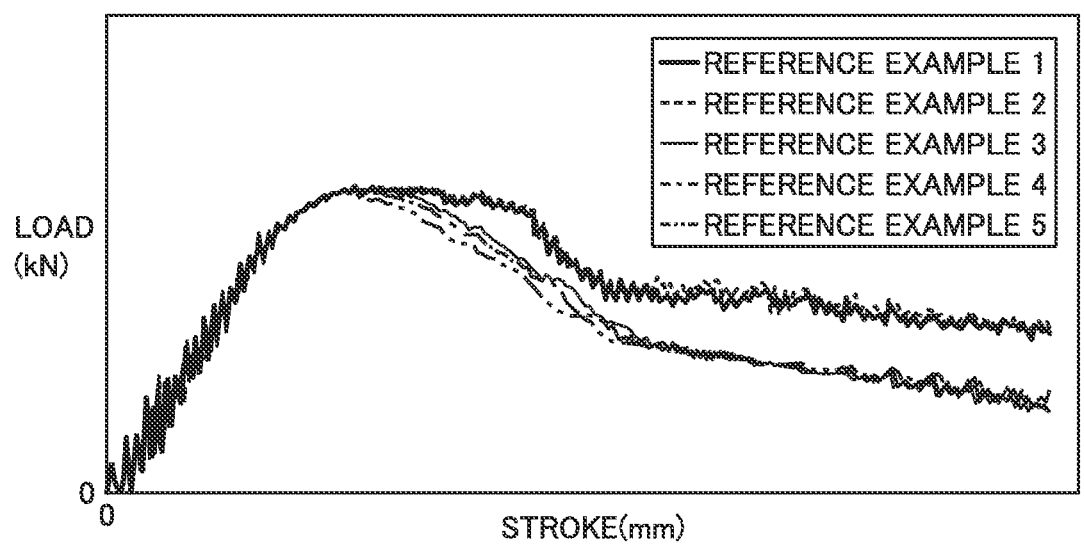
FIG. 17 is a graph showing results of a three-point bending test in Reference Examples 1 to 5.

A three-point bending test was performed on these Reference Examples 1 to 5. Then, in Reference Examples 1 and 2, tilting of the cross section (inclination of upper rib 40 and lower rib 50 inclining in the same direction in the vertical direction with respect to each of inner flanges 10 and 20) was relatively small. In contrast, in Reference Examples 3 to 5, tilting of the cross section was great in a range where a stroke of indenter 200 was large. FIG. 17 shows results of the three-point bending test in Reference Examples 1 to 5. As shown in FIG. 17, in Reference Examples 3 to 5, a load was small in a range where a stroke was large.

FIG. 18 shows a relation between aspect ratio L2/W and tilting of the cross section in Reference Examples 1 to 5. As shown in FIG. 18, aspect ratio L2/W of equal to or higher than 0.7 was found to be preferable in order to suppress tilting of the cross section.

As described above, in door beam 1 according to the present embodiment, upper inner flange 10 and lower inner flange 20 are spaced apart from each other in the vertical direction, i.e., upper inner flange 10 and lower inner flange 20 do not form a closed cross section, and thus, a reduction in weight can be achieved. In addition, although upper inner flange 10 and lower inner flange 20 form an open cross section, thickness t30 of outer flange 30 is larger than thickness t10 of upper inner flange 10 and the thickness of lower inner flange 20. Therefore, a significant increase in weight of door beam 1 as a whole is suppressed, and such deformation of upper rib 40 and lower rib 50 that inner flanges 10 and 20 are displaced so as to be spaced apart from each other when the door is subject to impact, i.e., such deformation that outer flange 30 becomes convex toward inner flanges 10 and 20 is suppressed. Furthermore, since the thickness of upper rib 40 and the thickness of lower rib 50 become gradually larger toward inner flanges 10 and 20, such deformation of upper rib 40 and lower rib 50 that inner flanges 10 and 20 are displaced so as to become closer to each other when the door is subject to impact is suppressed. Therefore, door beam 1 can be reduced in weight, while ensuring an amount of absorption of impact energy.

In addition, length h12 of upper outward-protruding portion 12 is equal to or longer than length h14 of upper inward-protruding portion 14, and a length of lower outward-protruding portion 22 is equal to or longer than a length of lower inward-protruding portion 24. Therefore, such deformation of upper rib 40 and lower rib 50 that inner flanges 10 and 20 are displaced so as to become closer to each other (such deformation that the cross section of door beam 1 is closed) when the door is subject to impact is suppressed more reliably.

In addition, angle θ1 formed by upper outer surface 40S1 and upper inner flange 10, and angle θ1 formed by lower outer surface 50S1 and lower inner flange 20 are obtuse angles, and upper inner surface 40S2 and lower inner surface 50S2 are orthogonal to outer flange 30. Therefore, such deformation of upper rib 40 and lower rib 50 that inner flanges 10 and 20 are displaced so as to become closer to each other (such deformation that the cross section of door beam 1 is closed) when the door is subject to impact is suppressed more reliably.

Moreover, aspect ratio L2/W is equal to or higher than 0.7. Therefore, such deformation of upper rib 40 and lower rib 50 that outer flange 30 is displaced upward or downward relative to inner flanges 10 and 20 (such deformation that the cross section of door beam 1 is tilted) is suppressed.

Figure 19:
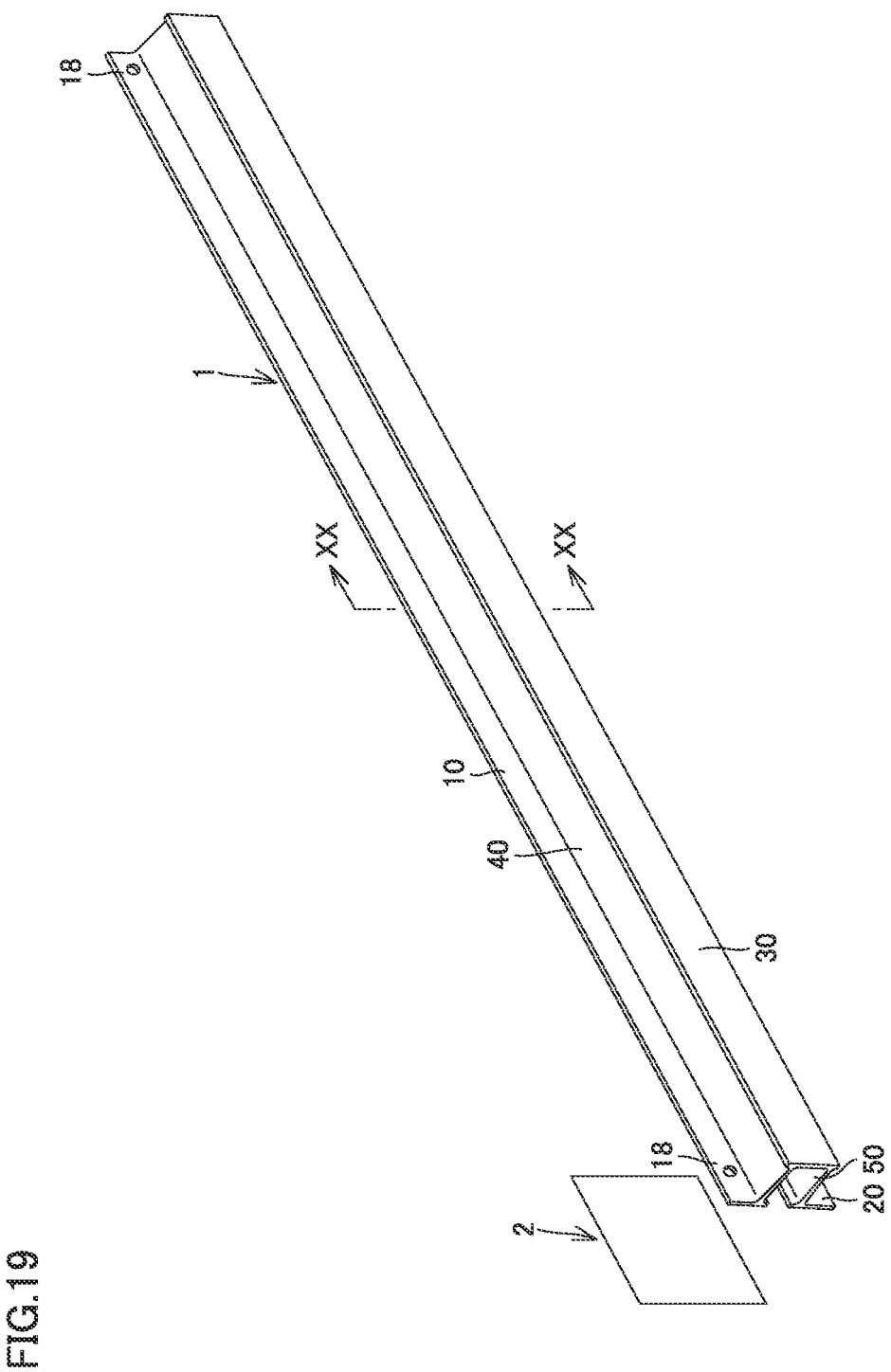
FIG. 19 is a perspective view showing a modification of door beam 1.
Figure 20:
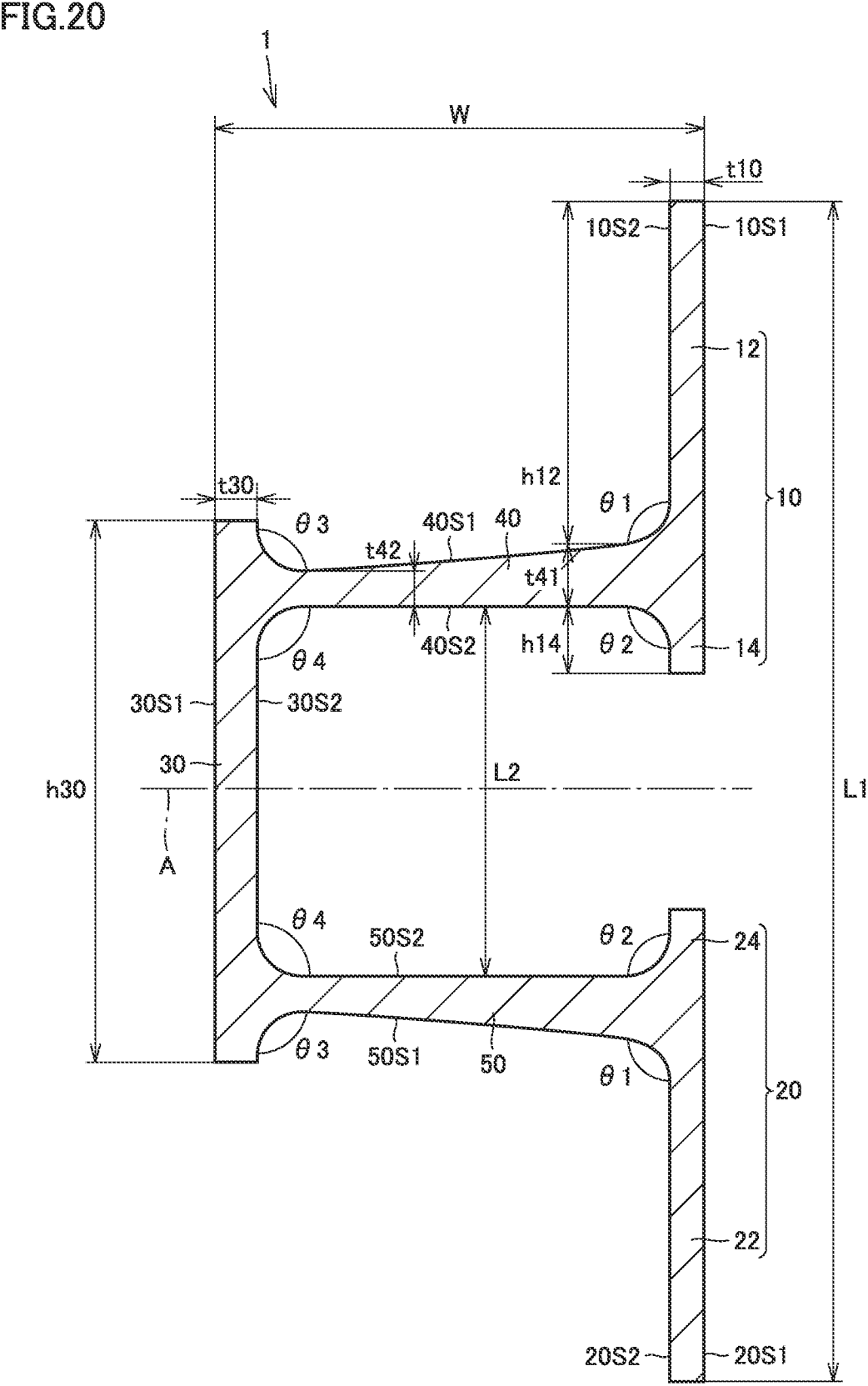
FIG. 20 is a cross-sectional view taken along line XX-XX shown in FIG. 19.

In the above-described embodiment, as shown in FIGS. 19 and 20, for example, the length of upper inner flange 10 in the vertical direction and the length of lower inner flange 20 in the vertical direction may be the same throughout the above-described one direction (longitudinal direction of door beam 1). In this case, it is preferable that thickness t10 of upper inner flange 10 and the thickness of lower inner flange 20 are set at 2 mm, and thickness t30 of outer flange 30 is set at 3.2 mm. In addition, length L1 from the upper end of upper inner flange 10 to the lower end of lower inner flange 20 is set at, for example, 84.6 mm.

Figure 21:
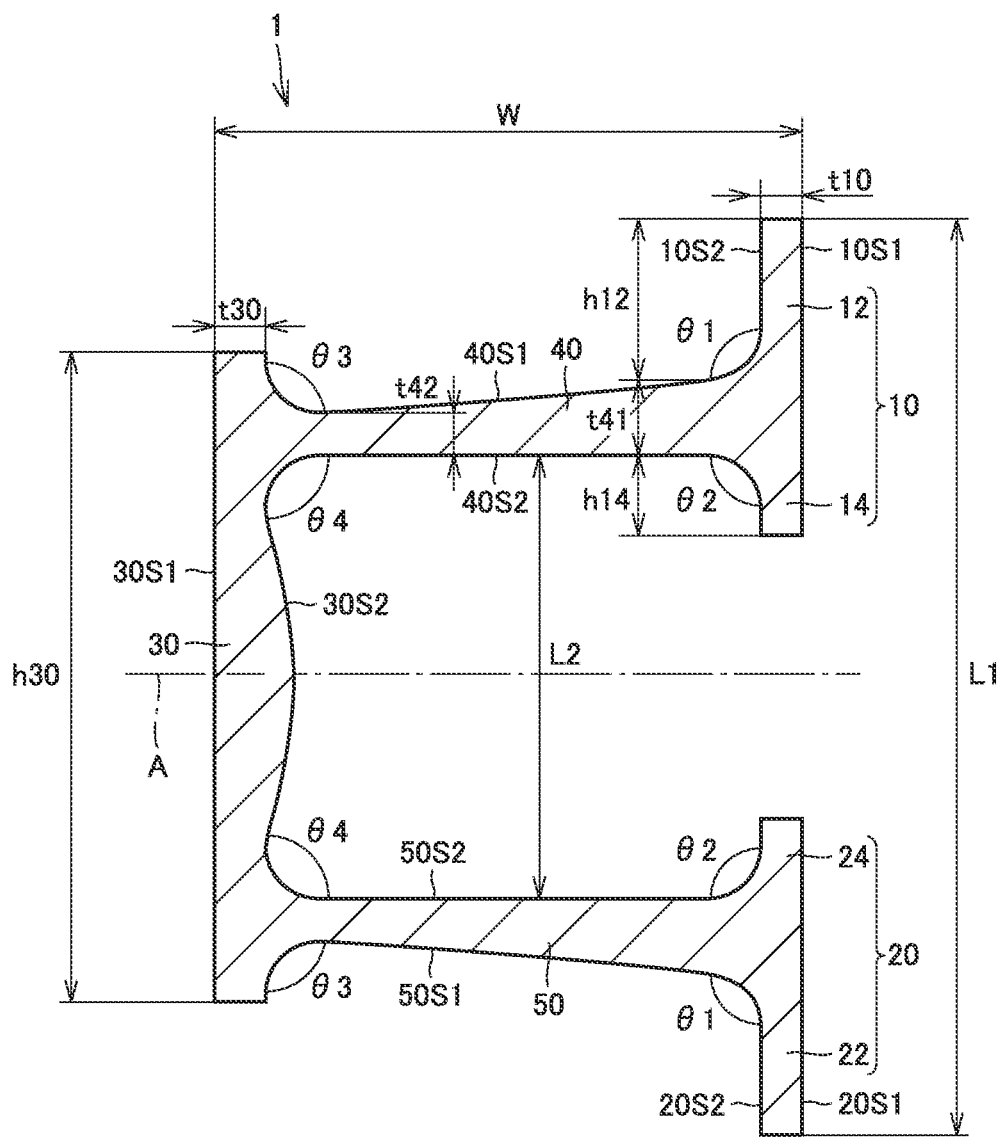
FIG. 21 is a cross-sectional view showing a modification of door beam 1.

In addition, as shown in FIG. 21, thickness t30 of outer flange 30 may become gradually larger with decreasing distance from symmetric plane A. In this case, it is preferable that outer surface 30S1 of outer flange 30 is formed to be flat, and inner surface 30S2 is formed to have a shape that is curved to be convex so as to be spaced apart from outer surface 30S1.

Second Embodiment

Figure 22:
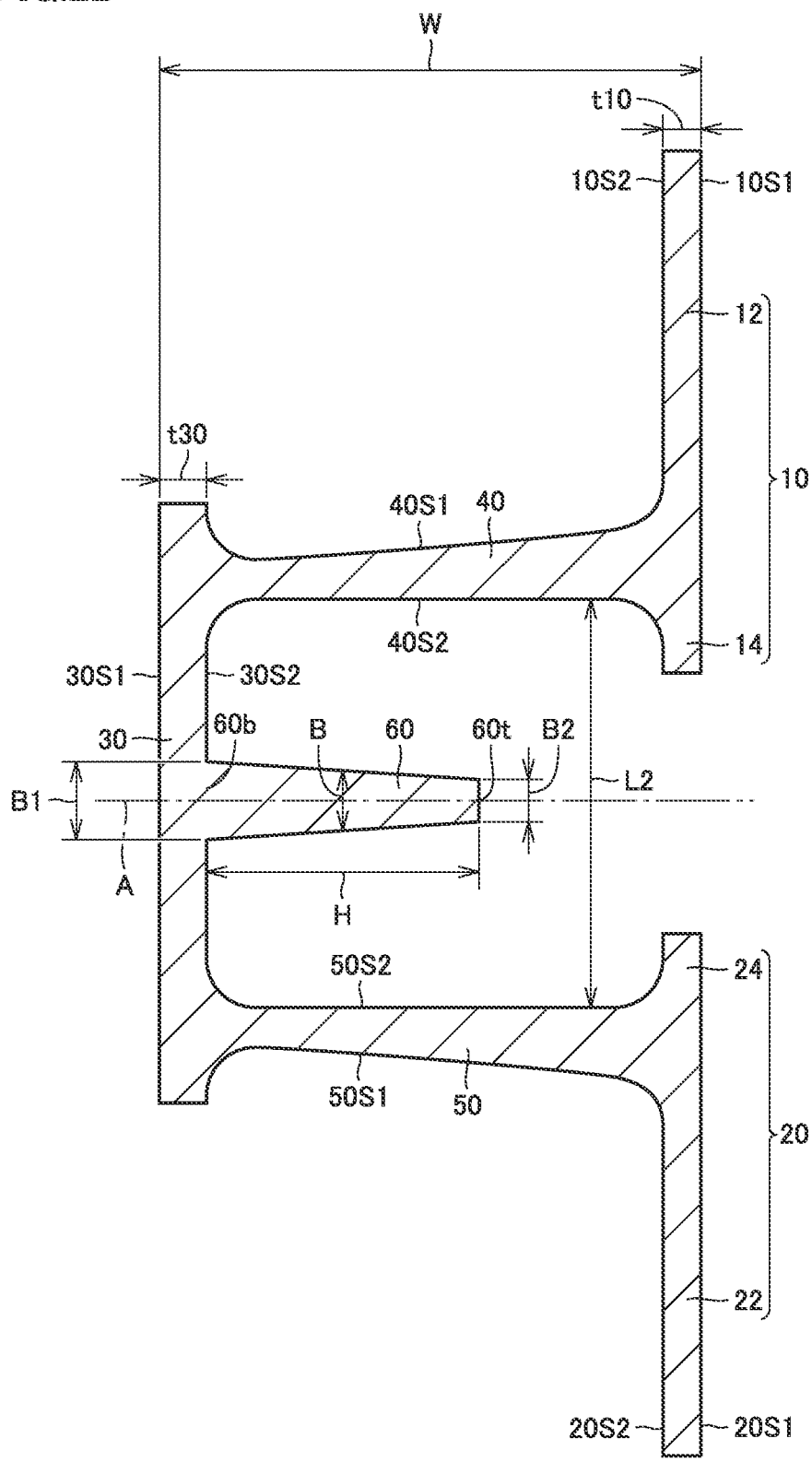
FIG. 22 is a cross-sectional view showing a door beam according to a second embodiment of the present invention.

FIG. 22 is a cross-sectional view showing a door beam according to a second embodiment. FIG. 22 corresponds to FIG. 20 in the first embodiment. The door beam according to the present embodiment is configured basically similarly to door beam 1 according to the first embodiment. Description of the common configuration will not be repeated hereinafter.

As shown in FIG. 22, the door beam according to the present embodiment further includes an intermediate rib 60. Intermediate rib 60 is arranged between upper rib 40 and lower rib 50. Intermediate rib 60 projects from outer flange 30.

Intermediate rib 60 has a rib shape that projects from inner surface 30S2 of outer flange 30 and extends linearly along the longitudinal direction of the door beam. Intermediate rib 60 is provided integrally with outer flange 30 by extrusion molding. Intermediate rib 60 has a cross-sectional shape that is the same at all positions in the longitudinal direction of the door beam when cut along a plane orthogonal to the longitudinal direction of the door beam.

Intermediate rib 60 includes a root portion 60b and a tip portion 60t. Root portion 60b is connected to outer flange 30. Tip portion 60t is a tip portion of intermediate rib 60 projecting from outer flange 30. Tip portion 60t is formed by a flat surface. Tip portion 60t may be formed by a curved surface.

A length (rib thickness) B of intermediate rib 60 in the vertical direction is shorter than distance L2 between upper inner surface 40S2 of upper rib 40 and lower inner surface 50S2 of lower rib 50 (B<L2). Length B of intermediate rib 60 in the vertical direction becomes shorter with increasing distance from outer flange 30. Length B of intermediate rib 60 in the vertical direction has a maximum value B1 at tip portion 60t, and has a minimum value B2 at root portion 60b. Length B of intermediate rib 60 in the vertical direction varies linearly between root portion 60b and tip portion 60t.

Length B of intermediate rib 60 in the vertical direction may vary non-linearly between root portion 60b and tip portion 60t. Length B of intermediate rib 60 in the vertical direction may be the same at all positions between root portion 60b and tip portion 60t.

The door beam according to the present embodiment has a symmetric shape with respect to symmetric plane A that is orthogonal to the vertical direction and passes through a center of outer flange 30 in the vertical direction. More specifically, outer flange 30 has a vertically symmetric cross-sectional shape with respect to symmetric plane A. Upper rib 40 and lower rib 50 have a vertically symmetric cross-sectional shape with respect to symmetric plane A. Upper inner flange 10 and lower inner flange 20 have a vertically symmetric cross-sectional shape with respect to symmetric plane A.

Intermediate rib 60 is provided at a position that overlaps with symmetric plane A. Intermediate rib 60 has a vertically symmetric cross-sectional shape with respect to symmetric plane A.

A projecting length (rib height) H of intermediate rib 60 from outer flange 30 is shorter than a rib height (W−t10−t30) of each of upper rib 40 and lower rib 50 (H<W−t10−t30). Projecting length H of intermediate rib 60 from outer flange 30 is longer than length B of intermediate rib 60 in the vertical direction (H>B).

Projecting length H of intermediate rib 60 from outer flange 30 may be equal to or shorter than length B of intermediate rib 60 in the vertical direction (H≤B).

As shown in FIG. 7, such a case is assumed that the door beam is deformed such that opening of the cross section (distance between upper inner flange 10 and lower inner flange 20) increases when the door is subject to excessive external force. In this case, a central portion of outer flange 30 in the vertical direction is deformed to be warped so as to become closer to upper inner flange 10 and lower inner flange 20, and thus, a break may occur in outer flange 30.

As shown in FIG. 22, in the present embodiment, intermediate rib 60 projecting from outer flange 30 is provided between upper rib 40 and lower rib 50. With such a configuration, strain of outer flange 30 that occurs when the door is subject to excessive external force can be relieved by intermediate rib 60. As a result, a break of outer flange 30 can be effectively suppressed.

In addition, length B of intermediate rib 60 in the vertical direction becomes shorter with increasing distance from outer flange 30. With such a configuration, by making length B of intermediate rib 60 in the vertical direction relatively long at a position close to outer flange 30, a break of outer flange 30 can be prevented more reliably. By making length B of intermediate rib 60 in the vertical direction relatively short at a position away from outer flange 30, an increase in weight of the door beam caused by addition of intermediate rib 60 can be suppressed.

In addition, in the door beam having a vertically symmetric shape with respect to symmetric plane A, intermediate rib 60 is provided at the position that overlaps with symmetric plane A. In the door beam having the vertically symmetric shape as described above, an amount of strain of outer flange 30 when the door is subject to excessive impact is likely to be large at the position that overlaps with symmetric plane A. Therefore, intermediate rib 60 is provided at the position that overlaps with symmetric plane A, and thus, a break of outer flange 30 can be more effectively suppressed.

In addition, projecting length H of intermediate rib 60 from outer flange 30 is longer than length B of intermediate rib 60 in the vertical direction.

With such a configuration, by making projecting length H of intermediate rib 60 from outer flange 30 relatively long, strain of outer flange 30 that occurs when the door is subject to excessive external force can be further relieved. In addition, in the door beam having a vertically symmetric shape with respect to symmetric plane A, the position that overlaps with symmetric plane A is preliminarily specified as a position where the amount of strain of outer flange 30 is large, and outer flange 30 is provided at this position. Therefore, even when length B of intermediate rib 60 in the vertical direction is made relatively short, a break of outer flange 30 can be suppressed reliably.

Next, Examples performed to evaluate the door beam according to the present embodiment will be described.

Figure 23:
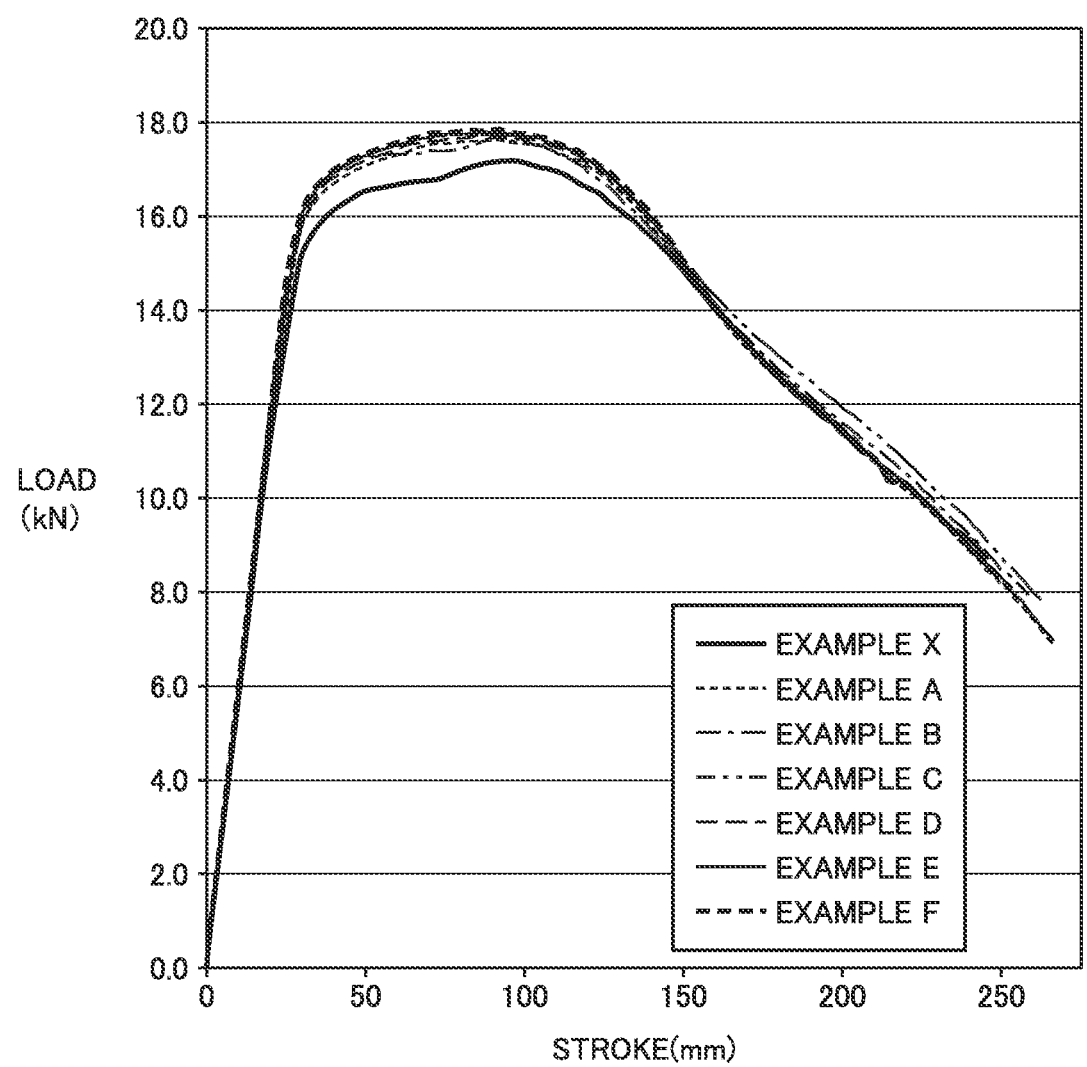
FIG. 23 is a graph showing results of CAE analysis of door beams in Examples A to F and X.
Figure 24:
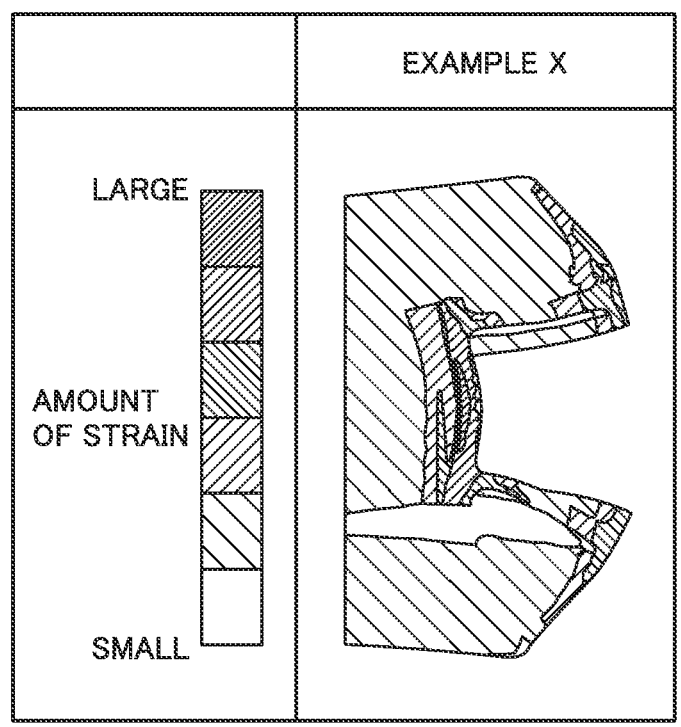
FIG. 24 shows a result of strain analysis of the door beam in Example X.
Figure 25:
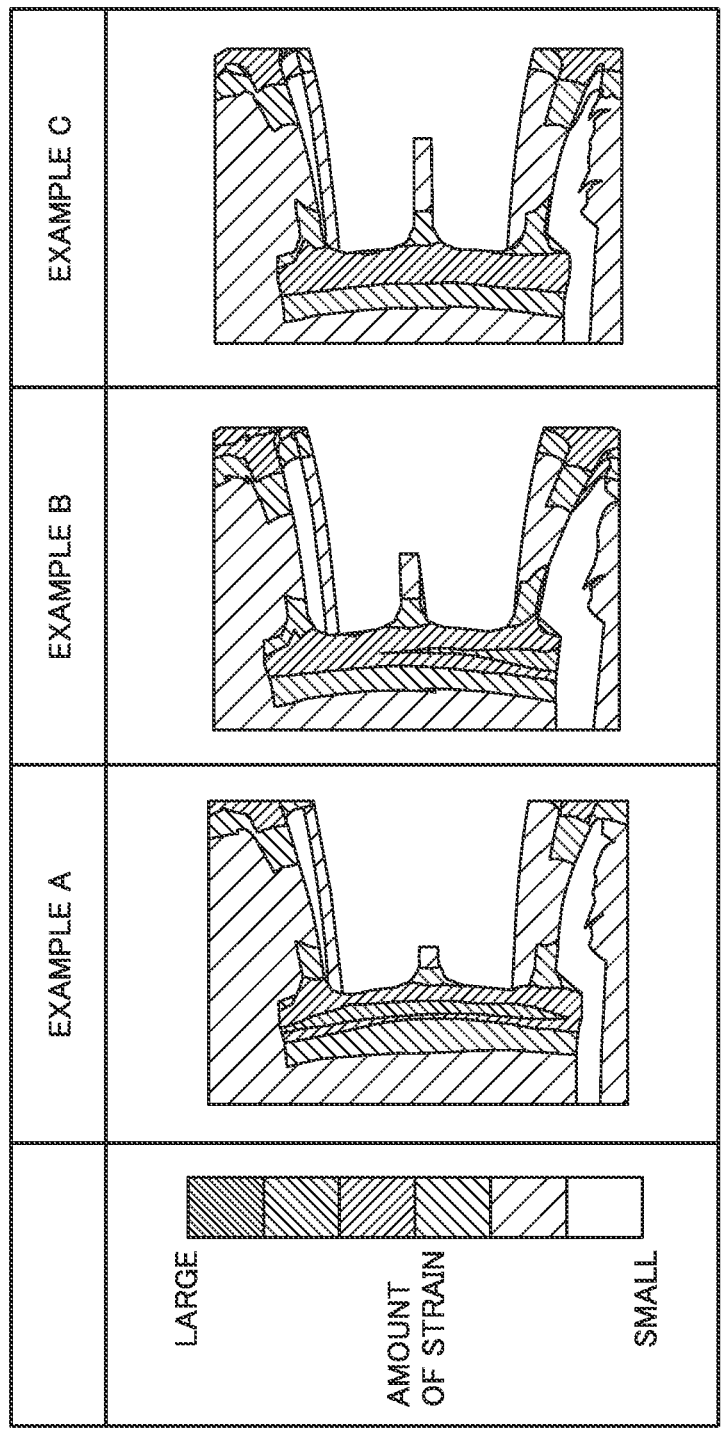
FIG. 25 shows results of strain analysis of the door beams in Examples A to C.
Figure 26:
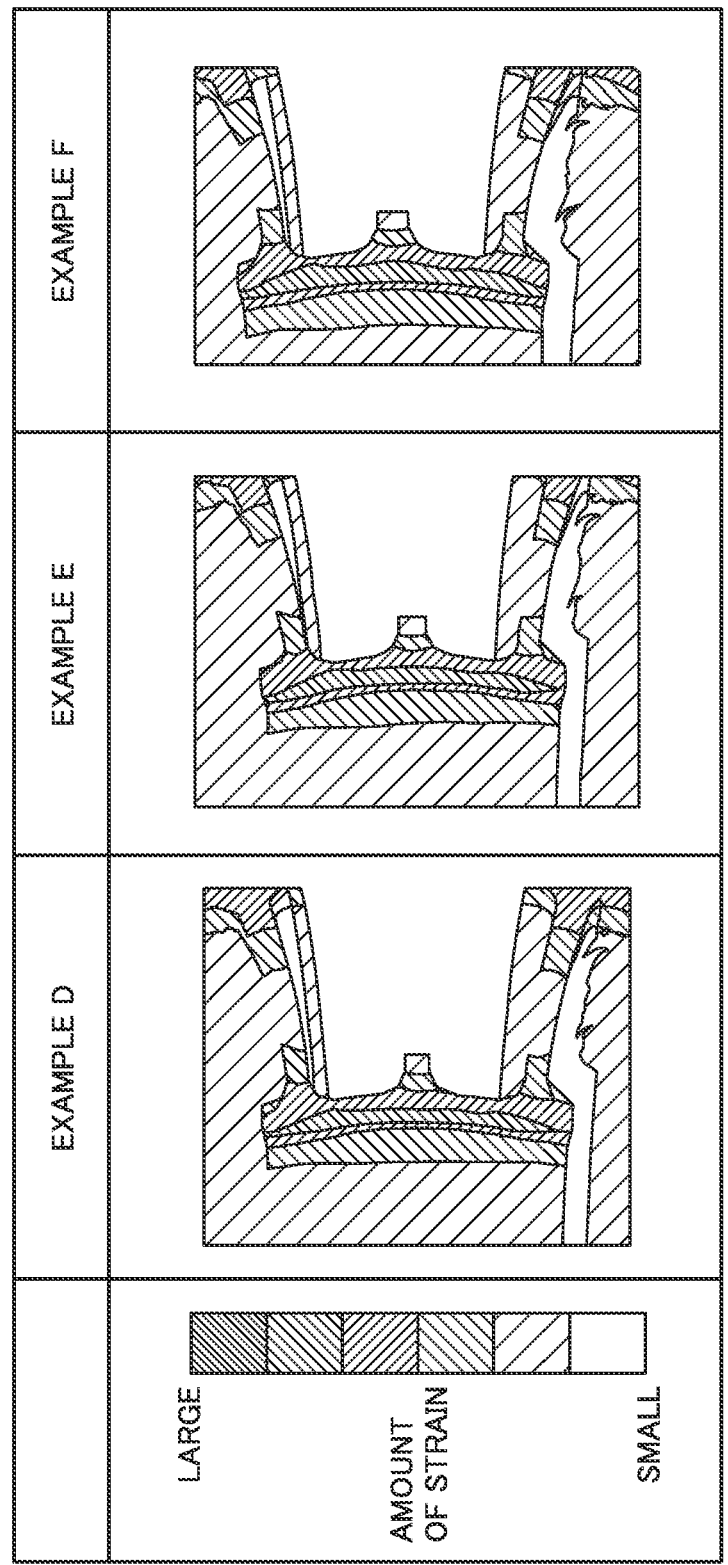
FIG. 26 shows results of strain analysis of the door beams in Examples D to F.

FIG. 23 is a graph showing results of CAE analysis of door beams in Examples A to F and X. FIG. 24 shows a result of strain analysis of the door beam in Example X. FIG. 25 shows results of strain analysis of the door beams in Examples A to C. FIG. 26 shows results of strain analysis of the door beams in Examples D to F.

The door beam in Example A includes intermediate rib 60 having rib height H of 5 mm and rib thickness B of 2.5 mm. The door beam in Example B includes intermediate rib 60 having rib height H of 10 mm and rib thickness B of 2.5 mm. The door beam in Example C includes intermediate rib 60 having rib height H of 15 mm and rib thickness B of 2.5 mm. The door beam in Example D includes intermediate rib 60 having rib height H of 5 mm and rib thickness B of 3 mm. The door beam in Example E includes intermediate rib 60 having rib height H of 5 mm and rib thickness B of 3.5 mm. The door beam in Example F includes intermediate rib 60 having rib height H of 5 mm and rib thickness B of 4 mm. The door beam in Example X is not provided with intermediate rib 60.

As shown in FIG. 23, CAE analysis was performed on the door beam in each Example under the condition of a three-point bending test, to thereby obtain a relation between a load and a stroke. It could be confirmed that by providing intermediate rib 60 on outer flange 30, a peak load that could be held increased.

As shown in FIGS. 24 to 26, strain analysis was performed on the door beam in each Example, to thereby obtain a distribution of an amount of strain of the door beam when the stroke was 120 mm/hour. As rib height H or rib thickness B of intermediate rib 60 was increased, the amount of strain of the door beam was more effectively relieved. In addition, the amount of strain was further relieved in Examples A to C in which rib height H of intermediate rib 60 was changed than in Examples D to F in which rib thickness B of intermediate rib 60 was changed.

Third Embodiment

Figure 27:
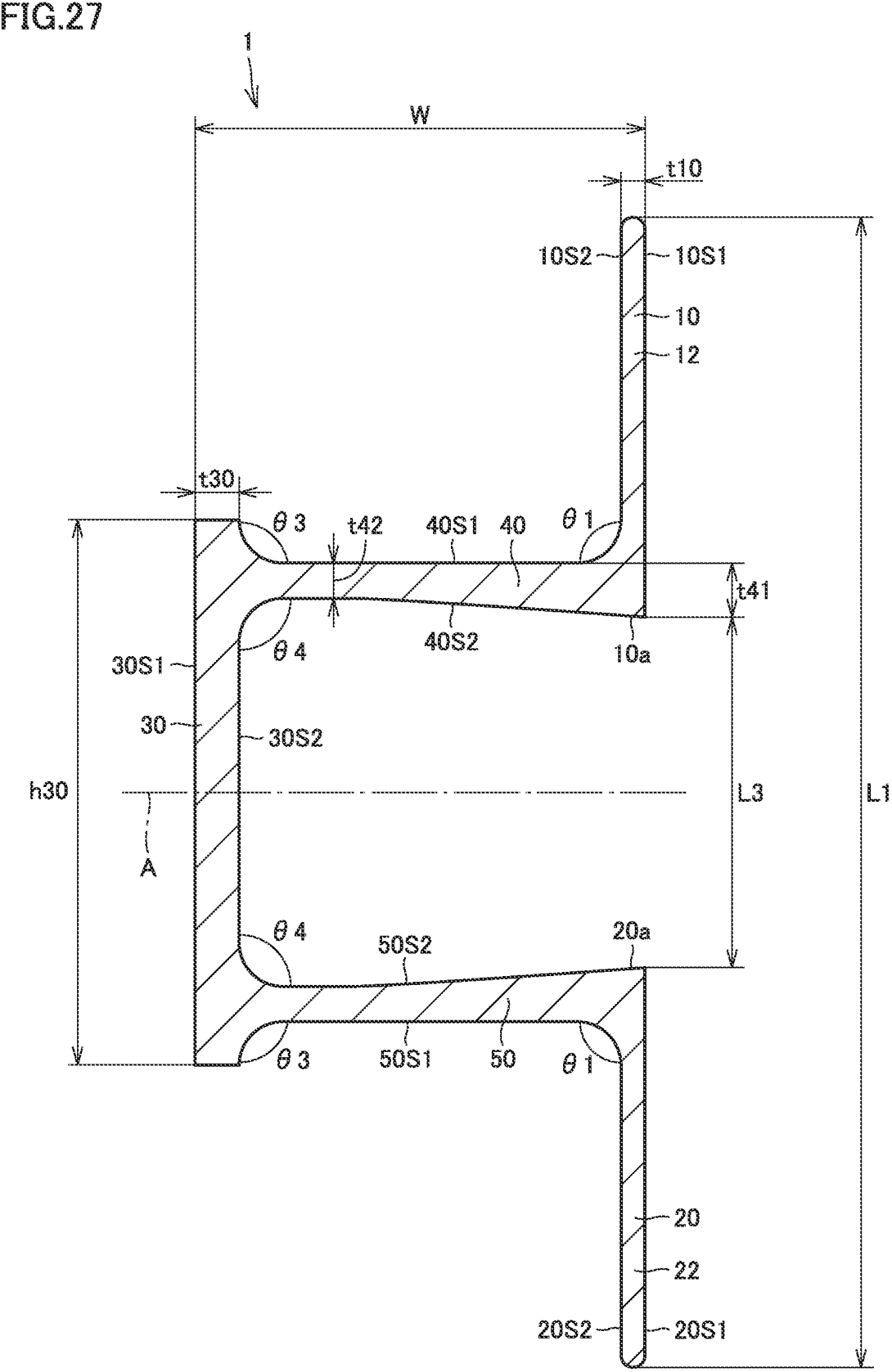
FIG. 27 is a cross-sectional view of a door beam according to a third embodiment of the present invention.

Next, door beam 1 according to a third embodiment of the present invention will be described with reference to FIG. 27. FIG. 27 is a cross-sectional view showing the door beam according to the third embodiment. In the third embodiment, only a difference from the first embodiment will be described and description of the structure, function and effect common to those of the first embodiment will not be repeated.

In the present embodiment, the shape of upper rib 40 and lower rib 50 is mainly different from that of the first embodiment.

Upper outer surface 40S1 of upper rib 40 is formed to be flat. Angle θ1 formed by upper outer surface 40S1 and inner surface 10S2 of upper inner flange 10 is 90 degrees. Angle θ3 formed by upper outer surface 40S1 and inner surface 30S2 of outer flange 30 is 90 degrees.

Upper inner surface 40S2 of upper rib 40 has a shape that is slightly curved to be convex upward. Angle θ4 formed by upper inner surface 40S2 and inner surface 30S2 is an acute angle. Angle θ4 is preferably set to be equal to or more than 80 degrees and less than 90 degrees. In the present embodiment, angle θ4 is 86 degrees. Angle θ4 refers to an angle formed by inner surface 30S2 and a tangential line in a portion of upper inner surface 40S2 where a curvature varies. Thickness t42 in this portion is set at, for example, 2.5 mm. Upper inner surface 40S2 may be formed to be flat.

That is, in the present embodiment, upper rib 40 has such a shape that a thickness thereof increases to become gradually closer to lower rib 50 from outer flange 30 toward upper inner flange 10. In other words, upper inner surface 40S2 has a shape that becomes gradually closer to lower inner surface 50S2 from outer flange 30 toward upper inner flange 10.

Upper inner flange 10 is not provided with upper inward-protruding portion 14. A lower end face 10a of upper inner flange 10 continuously (without any level difference) connects to upper inner surface 40S2. Thickness t41 in a boundary portion between upper inner surface 40S2 and lower end face 10a is set at, for example, 3.9 mm.

Lower rib 50 has a symmetric shape to upper rib 40 with respect to symmetric plane A. Therefore, description of lower rib 50 will not be repeated.

Lower inner flange 20 is not provided with lower inward-protruding portion 24. An upper end face 20a of lower inner flange 20 continuously (without any level difference) connects to lower inner surface 50S2.

Thickness t10 of upper inner flange 10 is set at, for example, 2 mm. Thickness t30 of outer flange 30 is set at, for example, 3.5 mm Distance W between outer surface 30S1 of outer flange 30 and outer surface 10S1 of upper inner flange 10 is set at, for example, 35 mm. Length L1 from the upper end of upper inner flange 10 to the lower end of lower inner flange 20 is set at, for example, 82.2 mm. Length L3 from lower end face 10a of upper inner flange 10 to upper end face 20a of lower inner flange 20 is set at, for example, 26.8 mm. Length L3 may be set at 28.8 mm.

Figure 28:
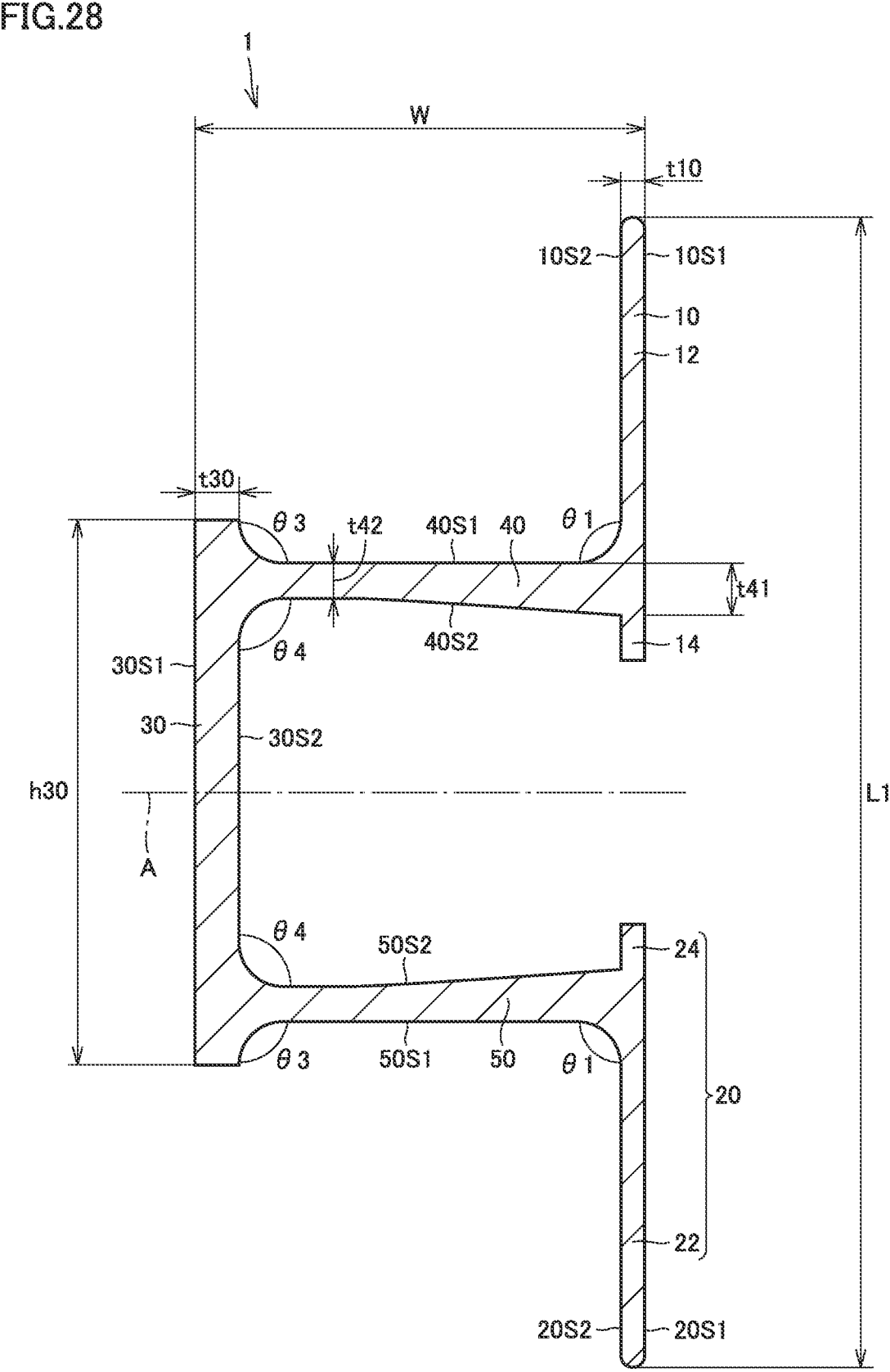
FIG. 28 is a cross-sectional view showing a modification of the door beam shown in FIG. 27.

FIG. 28 is a cross-sectional view showing a modification of door beam 1 shown in FIG. 27. In the present modification, upper inner flange 10 includes upper inward-protruding portion 14, and lower inner flange 20 includes lower inward-protruding portion 24. The shape of the remaining portions in the present modification is the same as the shape of door beam 1 shown in FIG. 27.

Figure 29:
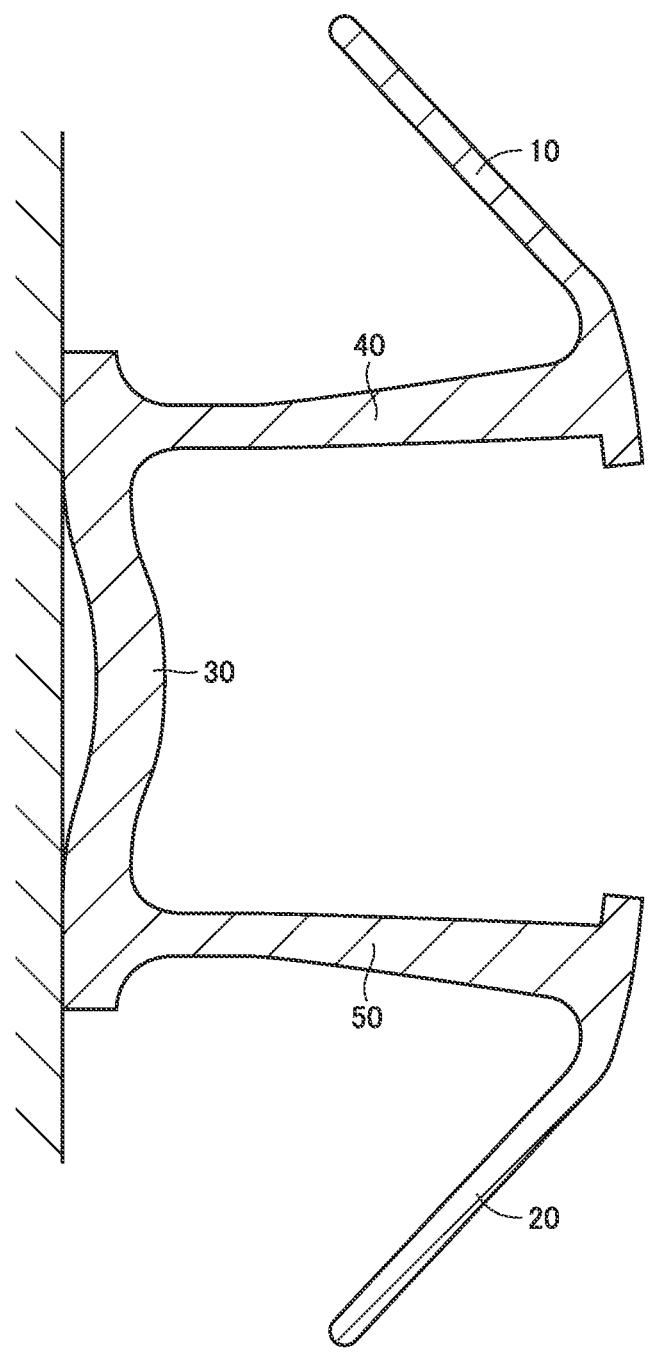
FIG. 29 is a cross-sectional view during a three-point bending test in Example 12.
Figure 30:
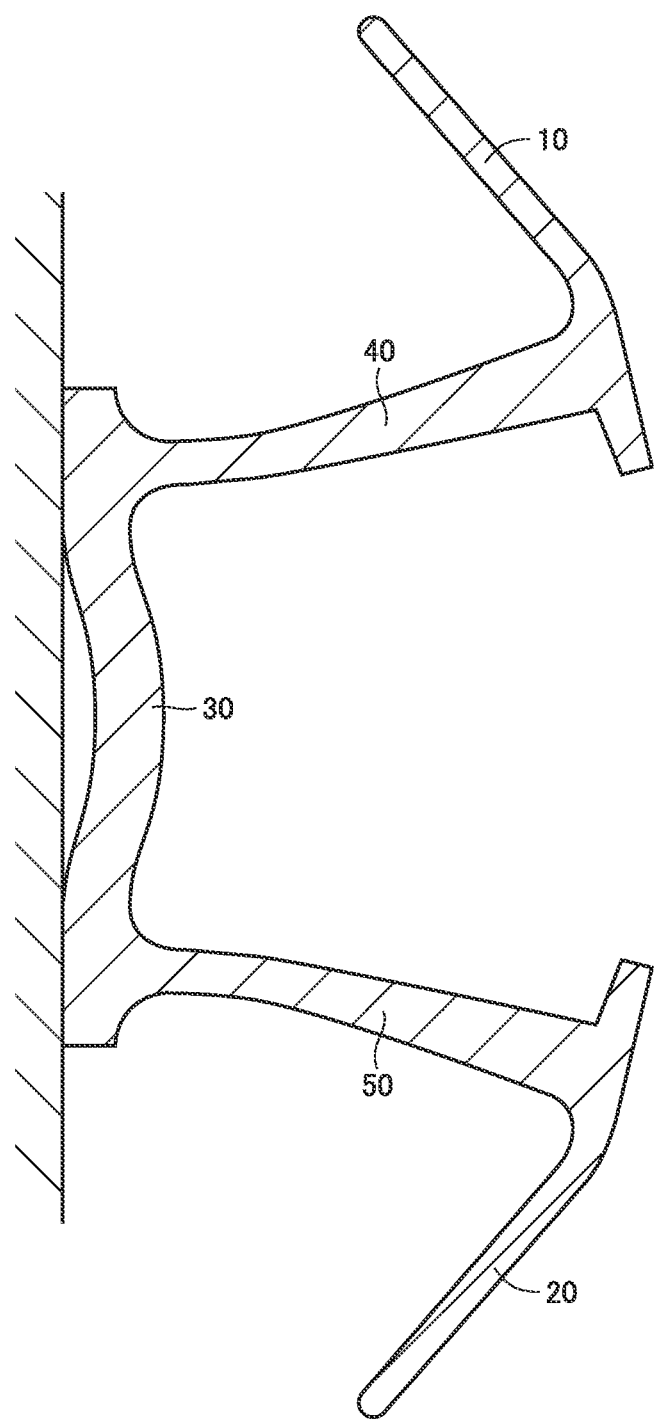
FIG. 30 is a cross-sectional view during a three-point bending test in Example 13.
Figure 31:
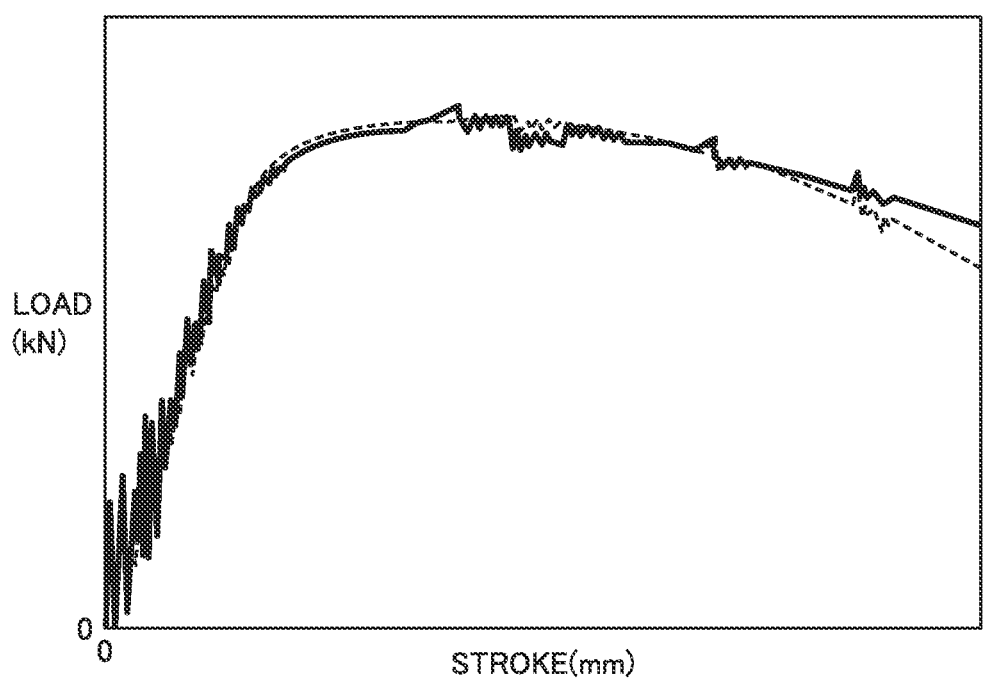
FIG. 31 is a graph showing results of CAE analysis in Examples 12 and 13.

Next, using Example 12 of door beam 1 shown in FIG. 28 and Example 13 of door beam 1 shown in FIG. 20, a three-point bending test was performed. FIG. 29 is a cross-sectional view during a three-point bending test in Example 12. FIG. 30 is a cross-sectional view during a three-point bending test in Example 13. FIG. 31 is a graph showing results of CAE analysis in Examples 12 and 13.

As shown in FIGS. 29 and 30, opening of the cross section (distance between upper inner flange 10 and lower inner flange 20) was smaller in Example 12 than in Example 13. As shown in FIG. 31, a load (amount of absorption of impact energy) was greater in a range where a stroke was large in Example 12 than in Example 13.

That is, it was confirmed that the amount of absorption of energy was larger without an increase in weight, when upper rib 40 and lower rib 50 had such a shape that thicknesses thereof increased so as to become gradually closer to each other from outer flange 30 toward upper inner flange 10 as shown in FIG. 28, than when upper rib 40 and lower rib 50 had such a shape that thicknesses thereof increased so as to be gradually spaced apart from each other from outer flange 30 toward upper inner flange 10 as shown in FIG. 20.

Figure 32:
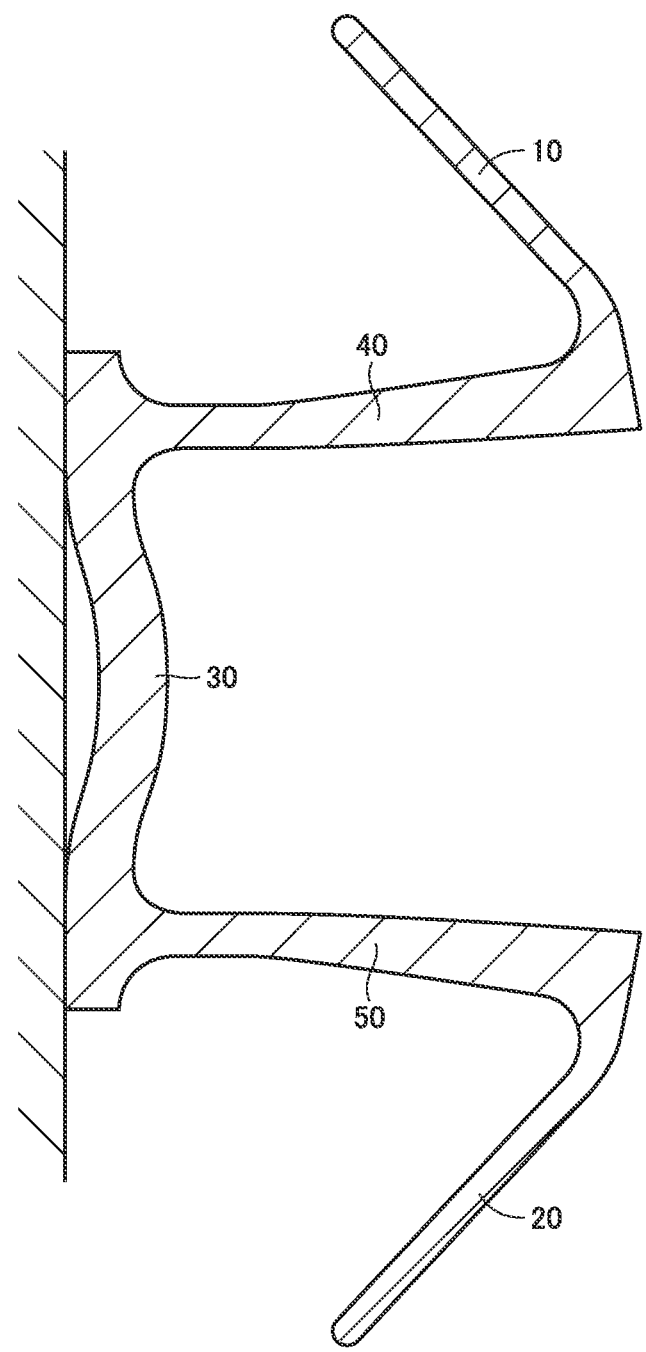
FIG. 32 is a cross-sectional view during a three-point bending test in Example 11.
Figure 33:
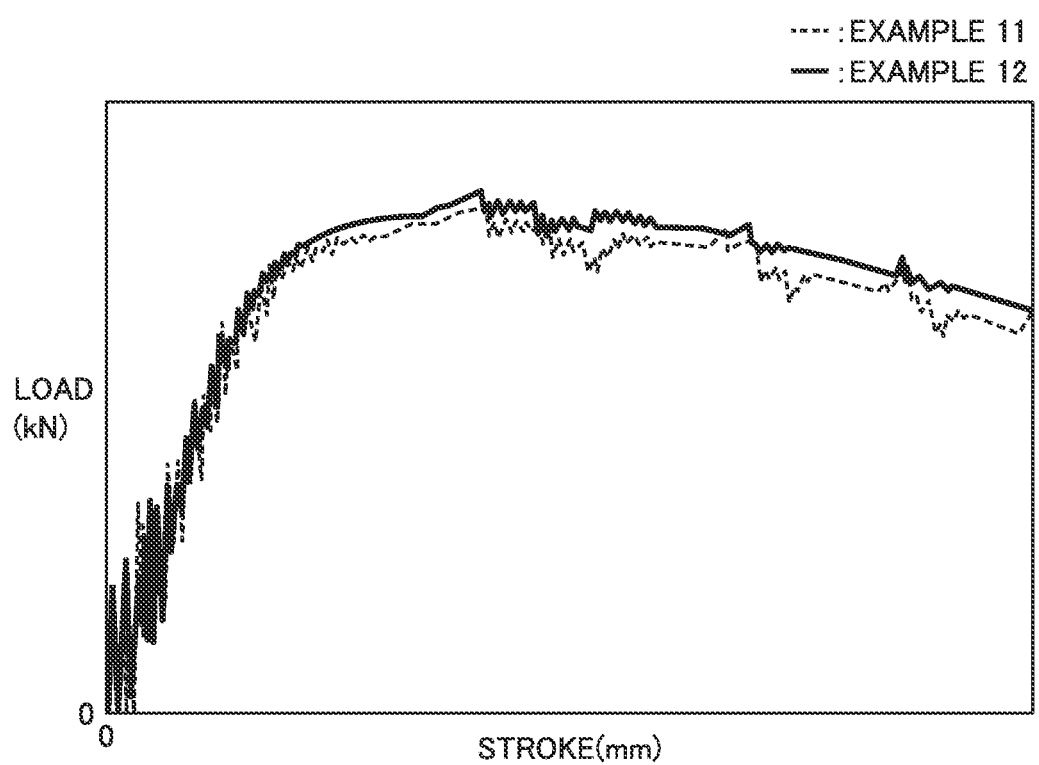
FIG. 33 is a graph showing results of CAE analysis in Examples 11 and 12.

Next, using Example 11 of door beam 1 shown in FIG. 27 and Example 12, a three-point bending test was performed. FIG. 32 is a cross-sectional view during a three-point bending test in Example 11. FIG. 33 is a graph showing results of CAE analysis in Examples 12 and 13.

As shown in FIGS. 29 and 32, a large difference in opening of the cross section was not seen between Example 11 and Example 12. As shown in FIG. 33, a load was slightly greater in Example 12 than in Example 11.

Furthermore, it was confirmed that upper inward-protruding portion 14 and lower inward-protruding portion 24 were not provided and the thickness of outer flange 30 was increased accordingly, and thereby, the amount of absorption of impact energy was further increased.

It is understood by those skilled in the art that the plurality of exemplary embodiments described above are specific examples of the following embodiments.

The door beam according to each of the above-described embodiments is a door beam arranged between an inner panel and an outer panel that form a door of a vehicle, the door beam reinforcing the inner panel and the outer panel, the door beam including: an upper inner flange arranged on the inner panel side; a lower inner flange arranged on the inner panel side and below the upper inner flange; an outer flange arranged on the outer panel side; an upper rib that couples the upper inner flange to the outer flange; and a lower rib that couples the lower inner flange to the outer flange, wherein a thickness of the outer flange is larger than a thickness of the upper inner flange and a thickness of the lower inner flange, a thickness of the upper rib becomes gradually larger from the outer flange toward the upper inner flange, and a thickness of the lower rib becomes gradually larger from the outer flange toward the lower inner flange.

In the door beam, the upper inner flange and the lower inner flange are spaced apart from each other in the vertical direction, i.e., the upper inner flange and the lower inner flange do not form a closed cross section, and thus, a reduction in weight can be achieved. In addition, although the upper inner flange and the lower inner flange form an open cross section, the thickness of the outer flange is larger than the thickness of the upper inner flange and the thickness of the lower inner flange. Therefore, a significant increase in weight of the door beam as a whole is suppressed, and such deformation of the upper rib and the lower rib that the inner flanges are displaced so as to be spaced apart from each other when the door is subject to impact, i.e., such deformation that the outer flange becomes convex toward the inner flanges is suppressed. Furthermore, since the thickness of the upper rib and the thickness of the lower rib become gradually larger toward the inner flanges, such deformation of the upper rib and the lower rib that the inner flanges are displaced so as to become closer to each other when the door is subject to impact is suppressed. Therefore, the door beam can be reduced in weight, while ensuring an amount of absorption of impact energy.

In addition, the upper inner flange may include: an upper outward-protruding portion having a shape that protrudes upward from the upper rib in a vertical direction; and an upper inward-protruding portion having a shape that protrudes downward from the upper rib in the vertical direction. The lower inner flange may include: a lower outward-protruding portion having a shape that protrudes downward from the lower rib in the vertical direction; and a lower inward-protruding portion having a shape that protrudes upward from the lower rib in the vertical direction. In this case, it is preferable that a length of the upper outward-protruding portion in the vertical direction is equal to or longer than a length of the upper inward-protruding portion in the vertical direction, and a length of the lower outward-protruding portion in the vertical direction is equal to or longer than a length of the lower inward-protruding portion in the vertical direction.

In the present embodiment, such deformation of the upper rib and the lower rib that the inner flanges are displaced so as to become closer to each other (such deformation that the cross section of the door beam is closed) when the door is subject to impact is suppressed more reliably.

In addition, the upper rib may include: an upper outer surface formed on an upper side in a vertical direction; and an upper inner surface formed on a lower side in the vertical direction. The lower rib may include: a lower outer surface formed on the lower side in the vertical direction; and a lower inner surface formed on the upper side in the vertical direction. In this case, it is preferable that an angle formed by the upper inner flange and one of the upper outer surface and the upper inner surface is an obtuse angle, and an angle formed by the lower inner flange and one of the lower outer surface and the lower inner surface is an obtuse angle.

In the present embodiment, such deformation of the upper rib and the lower rib that the inner flanges are displaced so as to become closer to each other (such deformation that the cross section of the door beam is closed) when the door is subject to impact is suppressed more reliably.

Specifically, it is preferable that an angle formed by the upper inner flange and the upper outer surface is an obtuse angle, an angle formed by the lower inner flange and the lower outer surface is an obtuse angle, and the upper inner surface and the lower inner surface are orthogonal to the outer flange.

In addition, it is preferable that a ratio of a distance between the upper inner surface and the lower inner surface to a distance between outer surfaces of the upper and lower inner flanges and an outer surface of the outer flange is equal to or higher than 0.7.

With such a configuration, such deformation of the upper rib and the lower rib that the outer flange is displaced upward or downward relative to the inner flanges (such deformation that the cross section of the door beam is tilted) is suppressed.

In addition, it is preferable that the upper inner flange, the lower inner flange, the outer flange, the upper rib, and the lower rib are made of aluminum or an aluminum alloy.

In the present embodiment, the door beam can be manufactured at relatively low cost.

In addition, it is preferable that the thickness of the upper inner flange, the thickness of the lower inner flange, the thickness of the outer flange, the thickness of the upper rib, and the thickness of the lower rib are uniform in a longitudinal direction orthogonal to both a direction that connects the upper inner flange and the outer flange and a vertical direction.

In the present embodiment, the door beam can be manufactured by extrusion molding.

In addition, the door beam further includes an intermediate rib arranged between the upper rib and the lower rib, and projecting from the outer flange.

In the present embodiment, a break of the outer flange can be effectively suppressed by the intermediate rib when the door is subject to excessive impact.

In addition, a length of the intermediate rib in a vertical direction becomes shorter with increasing distance from the outer flange.

According to the present embodiment, an increase in weight of the door beam caused by addition of the intermediate rib is suppressed and a break of the outer flange can be effectively suppressed.

In addition, when the door beam has a symmetric shape with respect to a symmetric plane that is orthogonal to a vertical direction and passes through a center of the outer flange in the vertical direction, the intermediate rib is provided at a position that overlaps with the symmetric plane.

In the present embodiment, in the case where the door beam has a symmetric shape with respect to the symmetric plane that is orthogonal to the vertical direction and passes through the center of the outer flange in the vertical direction, an amount of strain of the outer flange is likely to be large at the position that overlaps with the symmetric plane, when the door is subject to excessive impact. Therefore, the intermediate rib is provided at the position that overlaps with the symmetric plane, and thus, a break of the outer flange can be more effectively suppressed.

In addition, a projecting length of the intermediate rib from the outer flange is longer than a length of the intermediate rib in the vertical direction.

In the present embodiment, by making the projecting length of the intermediate rib from the outer flange relatively long, the effect of suppressing a break of the outer flange by the intermediate rib can be increased. In addition, the position that overlaps with the symmetric plane is preliminarily specified as a position where the amount of strain of the outer flange is large, and the outer flange is provided at this position. Therefore, even when the length of the intermediate rib in the vertical direction is made relatively short, a break of the outer flange can be effectively suppressed.

In addition, the upper inner flange may include an upper outward-protruding portion having a shape that protrudes upward from the upper rib in a vertical direction. The lower inner flange may include a lower outward-protruding portion having a shape that protrudes downward from the lower rib in the vertical direction. The upper rib may include: an upper outer surface formed on an upper side in the vertical direction; and an upper inner surface formed on a lower side in the vertical direction. The lower rib may include: a lower outer surface formed on the lower side in the vertical direction; and a lower inner surface formed on the upper side in the vertical direction. The upper outer surface may be orthogonal to both the upper outward-protruding portion and the outer flange. The lower outer surface may be orthogonal to both the lower outward-protruding portion and the outer flange. The upper inner surface may have a shape that becomes gradually closer to the lower inner surface from the outer flange toward the upper inner flange. The lower inner surface may have a shape that becomes gradually closer to the upper inner surface from the outer flange toward the lower inner flange.

In the present embodiment, such deformation of the upper rib and the lower rib that the inner flanges are displaced so as to become closer to each other (such deformation that the cross section of the door beam is closed) when the door is subject to impact is suppressed more reliably.

In this case, it is preferable that the upper inner flange has a lower end face that continuously connects to the upper inner surface, and the lower inner flange has an upper end face that continuously connects to the lower inner surface.

While the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A door beam arranged between an inner panel and an outer panel that form a door of a vehicle, the door beam reinforcing the inner panel and the outer panel, the door beam comprising:
    an upper inner flange arranged on the inner panel side;
    a lower inner flange arranged on the inner panel side and below the upper inner flange;
    an outer flange arranged on the outer panel side;
    an upper rib that couples the upper inner flange to the outer flange; and
    a lower rib that couples the lower inner flange to the outer flange, wherein
    a thickness of the outer flange is larger than a thickness of the upper inner flange and a thickness of the lower inner flange,
    a thickness of the upper rib becomes gradually larger from the outer flange toward the upper inner flange,
    a thickness of the lower rib becomes gradually larger from the outer flange toward the lower inner flange,
    the upper inner flange includes:
        an upper outward-protruding portion having a shape that protrudes upward from the upper rib in a vertical direction, and
        an upper inward-protruding portion having a shape that protrudes downward from the upper rib in the vertical direction, the lower inner flange includes:
a lower outward-protruding portion having a shape that protrudes downward from the lower rib in the vertical direction, and
a lower inward-protruding portion having a shape that protrudes upward from the lower rib in the vertical direction,
a length of the upper outward-protruding portion in the vertical direction is equal to or longer than a length of the upper inward-protruding portion in the vertical direction, and
a length of the lower outward-protruding portion in the vertical direction is equal to or longer than a length of the lower inward-protruding portion in the vertical direction.

2. The door beam according to claim 1, wherein
the upper rib includes:
an upper outer surface formed on an upper side in a vertical direction; and
an upper inner surface formed on a lower side in the vertical direction,
the lower rib includes:
a lower outer surface formed on the lower side in the vertical direction, and
a lower inner surface formed on the upper side in the vertical direction,
an angle formed by the upper inner flange and one of the upper outer surface and the upper inner surface is an obtuse angle, and
an angle formed by the lower inner flange and one of the lower outer surface and the lower inner surface is an obtuse angle.

3. A door beam arranged between an inner panel and an outer panel that form a door of a vehicle, the door beam reinforcing the inner panel and the outer panel, the door beam comprising:
an upper inner flange arranged on the inner panel side;
a lower inner flange arranged on the inner panel side and below the upper inner flange;
an outer flange arranged on the outer panel side;
an upper rib that couples the upper inner flange to the outer flange; and
a lower rib that couples the lower inner flange to the outer flange, wherein
a thickness of the outer flange is larger than a thickness of the upper inner flange and a thickness of the lower inner flange,
a thickness of the upper rib becomes gradually larger from the outer flange toward the upper inner flange,
a thickness of the lower rib becomes gradually larger from the outer flange toward the lower inner flange,
the upper rib includes:
an upper outer surface formed on an upper side in a vertical direction, and
an upper inner surface formed on a lower side in the vertical direction,
the lower rib includes:
a lower outer surface formed on the lower side in the vertical direction, and
a lower inner surface formed on the upper side in the vertical direction,
an angle formed by the upper inner flange and the upper outer surface is an obtuse angle,
an angle formed by the lower inner flange and the lower outer surface is an obtuse angle, and
the upper inner surface and the lower inner surface are orthogonal to the outer flange.

4. The door beam according to claim 3, wherein
a ratio of a distance between the upper inner surface and the lower inner surface to a distance between outer surfaces of the upper and lower inner flanges and an outer surface of the outer flange is equal to or higher than 0.7.

5. The door beam according to claim 1, wherein
the upper inner flange, the lower inner flange, the outer flange, the upper rib, and the lower rib are made of aluminum or an aluminum alloy.

6. The door beam according to claim 1, wherein
the thickness of the upper inner flange, the thickness of the lower inner flange, the thickness of the outer flange, the thickness of the upper rib, and the thickness of the lower rib are uniform in a longitudinal direction orthogonal to both a direction that connects the upper inner flange and the outer flange and a vertical direction.

7. A door beam arranged between an inner panel and an outer panel that form a door of a vehicle, the door beam reinforcing the inner panel and the outer panel, the door beam comprising:
an upper inner flange arranged on the inner panel side;
a lower inner flange arranged on the inner panel side and below the upper inner flange;
an outer flange arranged on the outer panel side;
an upper rib that couples the upper inner flange to the outer flange;
a lower rib that couples the lower inner flange to the outer flange; and
an intermediate rib arranged between the upper rib and the lower rib, and projecting from the outer flange, wherein
a thickness of the outer flange is larger than a thickness of the upper inner flange and a thickness of the lower inner flange,
a thickness of the upper rib becomes gradually larger from the outer flange toward the upper inner flange, and
a thickness of the lower rib becomes gradually larger from the outer flange toward the lower inner flange.

8. The door beam according to claim 7, wherein
a length of the intermediate rib in a vertical direction becomes shorter with increasing distance from the outer flange.

9. The door beam according to claim 7, wherein
when the door beam has a symmetric shape with respect to a symmetric plane that is orthogonal to a vertical direction and passes through a center of the outer flange in the vertical direction, the intermediate rib is provided at a position that overlaps with the symmetric plane.

10. The door beam according to claim 9, wherein
a projecting length of the intermediate rib from the outer flange is longer than a length of the intermediate rib in the vertical direction.

11. The door beam according to claim 7, wherein
the upper inner flange includes an upper outward-protruding portion having a shape that protrudes upward from the upper rib in a vertical direction,
the lower inner flange includes a lower outward-protruding portion having a shape that protrudes downward from the lower rib in the vertical direction,
the upper rib includes:
an upper outer surface formed on an upper side in the vertical direction, and
an upper inner surface formed on a lower side in the vertical direction, the lower rib includes:
   a lower outer surface formed on the lower side in the vertical direction, and
   a lower inner surface formed on the upper side in the vertical direction, the upper outer surface is orthogonal to both the upper outward-protruding portion and the outer flange, the lower outer surface is orthogonal to both the lower outward-protruding portion and the outer flange, the upper inner surface has a shape that becomes gradually closer to the lower inner surface from the outer flange toward the upper inner flange, and the lower inner surface has a shape that becomes gradually closer to the upper inner surface from the outer flange toward the lower inner flange.

12. The door beam according to claim 11, wherein the upper inner flange has a lower end face that continuously connects to the upper inner surface, and the lower inner flange has an upper end face that continuously connects to the lower inner surface.

\* \* \* \* \*